US 12,273,858 B2

(12) United States Patent
Li et al.

(10) Patent No.: US 12,273,858 B2
(45) Date of Patent: Apr. 8, 2025

(54) DISCONTINUOUS RECEPTION CYCLE EXTENSION AND PAGING WITH EXTERNAL ASSISTANCE

(71) Applicant: Qualcomm Incorporated, San Diego, CA (US)

(72) Inventors: Qiaoyu Li, Beijing (CN); Chao Wei, Beijing (CN); Hao Xu, Beijing (CN); Huilin Xu, Temecula, CA (US); Jing Lei, San Diego, CA (US); Peter Pui Lok Ang, San Diego, CA (US); Wanshi Chen, San Diego, CA (US); Le Liu, San Jose, CA (US); Yiqing Cao, Beijing (CN); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 331 days.

(21) Appl. No.: 17/776,555

(22) PCT Filed: Dec. 4, 2019

(86) PCT No.: PCT/CN2019/123130
§ 371 (c)(1),
(2) Date: May 12, 2022

(87) PCT Pub. No.: WO2021/109046
PCT Pub. Date: Jun. 10, 2021

(65) Prior Publication Data
US 2022/0408405 A1 Dec. 22, 2022

(51) Int. Cl.
*H04W 68/02* (2009.01)
*H04W 76/10* (2018.01)
(Continued)

(52) U.S. Cl.
CPC .......... *H04W 68/02* (2013.01); *H04W 76/10* (2018.02); *H04W 76/28* (2018.02); *H04W 88/04* (2013.01)

(58) Field of Classification Search
None
See application file for complete search history.

(56) References Cited

U.S. PATENT DOCUMENTS

2010/0317374 A1 12/2010 Alpert et al.
2015/0195774 A1 7/2015 Lee et al.
(Continued)

FOREIGN PATENT DOCUMENTS

CN 106455015 A 2/2017
EP 3499975 A1 6/2019
(Continued)

OTHER PUBLICATIONS

Huawei et al., "Extending DRX Cycle in Idle Mode", 3GPP TSG-RAN WG2 #91, R2-153339, Aug. 28, 2015 (Aug. 28, 2015), pp. 1-3.
(Continued)

*Primary Examiner* — Kenneth B Wells
(74) *Attorney, Agent, or Firm* — Holland & Hart LLP

(57) ABSTRACT

Idle discontinuous reception (I-DRX) cycles at a user equipment (UE) may be extended via leveraging of paging assistance from a second UE. For example, a low complexity UE may have a connection to a network (e.g., via a link to a base station) as well as a connection to another UE (e.g., via a device-to-device link to a regular UE). In cases where such a low complexity UE receives paging messages from the network, a UE associated with a device-to-device link of the low complexity UE may monitor paging messages on behalf of the low complexity UE. As such, the low complexity UE may extend its I-DRX cycle, as the assisting UE
(Continued)

monitors paging information for the low complexity UE. The assisting UE may forward paging information for the low complexity UE according to paging occasions of the extended I-DRX cycle of the low complexity UE.

35 Claims, 20 Drawing Sheets

(51) Int. Cl.
*H04W 76/28* (2018.01)
*H04W 88/04* (2009.01)

(56) References Cited

U.S. PATENT DOCUMENTS

| | | |
|---|---|---|
| 2017/0273078 A1 | 9/2017 | Rico Alvarino et al. |
| 2018/0263012 A1 | 9/2018 | Ryu et al. |
| 2019/0261443 A1 | 8/2019 | Baligh et al. |
| 2023/0319852 A1* | 10/2023 | Lee .................. H04W 72/23 370/328 |

FOREIGN PATENT DOCUMENTS

| | | |
|---|---|---|
| WO | WO-2013017006 A1 | 2/2013 |
| WO | WO-2017135871 A1 | 8/2017 |

OTHER PUBLICATIONS

International Search Report and Written Opinion—PCT/CN2019/123130—ISA/EPO—Aug. 27, 2020.
Sequans Communications: "NB-IoT UE Specific DRX—Efficiency Issues", 3GPP TSG-RAN WG2 Meeting #108, R2-1916236, 3rd Generation Partnership Project, Mobile Competence Centre, 650, Route Des Lucioles, F-06921 Sophia-Antipolis Cedex, France, vol. RAN WG2, No. Reno, USA, Nov. 14, 2019-Nov. 18, 2019, Nov. 8, 2019, XP051817776, 5 pages.
Supplementary European Search Report—EP19955292—Search Authority—Berlin—Jul. 27, 2023.

* cited by examiner

DISCONTINUOUS RECEPTION CYCLE EXTENSION AND PAGING WITH EXTERNAL ASSISTANCE

CROSS REFERENCE

The present Application is a 371 national stage filing of International PCT Application No. PCT/CN2019/123130 by Li et al., entitled "DISCONTINUOUS RECEPTION CYCLE EXTENSION AND PAGING WITH EXTERNAL ASSISTANCE," filed Dec. 4, 2019, which is assigned to the assignee hereof, and which is expressly incorporated by reference in its entirety herein.

BACKGROUND

The following relates generally to wireless communications, and more specifically to discontinuous reception (DRX) cycle extension and paging with external assistance.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some cases, a UE may monitor for paging messages while in a low power, idle, or inactive state. For example, to conserve power, a UE may operate in a low power state and may periodically wakeup to monitor for paging messages (e.g., according to a discontinuous reception (DRX) cycle). When the UE has pending messages, a base station may transmit a paging message to the UE (e.g., during a paging occasion of the DRX cycle). Upon reception of a paging message, the UE may transition to a full power state or an active state for data transfer between the base station and the UE (e.g., such that the base station may relay the pending messages).

SUMMARY

The described techniques relate to improved methods, systems, devices, and apparatuses that support discontinuous reception (DRX) cycle extension and paging with external assistance. Generally, the described techniques provide for improved paging procedures within wireless communications systems. For example, the described techniques may provide for improved paging procedures for user equipment (UEs) with reduced capabilities (e.g., such as for low complexity UEs, low tier UEs, New Radio (NR)-Light devices, Internet of Things (IoT) devices, etc.). According to some aspects, a low complexity UE may leverage external assistance from other UEs (e.g., via device-to-device communications) to improve paging procedures for the low complexity UE. For example, a low complexity UE may be in communication with another UE (e.g., with a premium UE or more capable UE) via a device-to-device communication link (e.g., via sidelink), and the low complexity UE may leverage the device-to-device link to improve paging procedures (e.g., to simplify paging procedures, to increase the robustness of paging procedures, to realize increased power savings during paging procedures, etc.).

According to some aspects, the described techniques may provide for extension of idle DRX cycles at a UE via leveraging of paging assistance from a second UE. For example, a low complexity UE may have a connection to a network (e.g., via a link to a base station) as well as a connection to another UE (e.g., via a device-to-device link to a regular UE or a non-low complexity UE). In cases where such a low complexity UE receives paging messages from the network, a UE associated with a device-to-device link of the low complexity UE may monitor paging messages on behalf of the low complexity UE. As such, the low complexity UE may extend its idle DRX cycle (e.g., for further power savings at the low complexity UE) as the assisting UE monitors paging information for the low complexity UE. The low complexity UE may thus operate according to the extended idle DRX cycle, and may receive paging information forwarded from the assisting UE (e.g., the assisting UE may forward paging information for the low complexity UE according to paging occasions of the extended idle DRX cycle of the low complexity UE).

A method of wireless communication at a first UE is described. The method may include transmitting a request for paging assistance to a second UE, configuring a first discontinuous reception cycle associated with an extended paging periodicity based on the transmitted request, and receiving paging information from the second UE in response to the configured first discontinuous reception cycle, where the paging information includes paging information from a base station.

An apparatus for wireless communication at a first UE is described. The apparatus may include a processor, memory coupled with the processor, and instructions stored in the memory. The instructions may be executable by the processor to cause the apparatus to transmit a request for paging assistance to a second UE, configure a first discontinuous reception cycle associated with an extended paging periodicity based on the transmitted request, and receive paging information from the second UE in response to the configured first discontinuous reception cycle, where the paging information includes paging information from a base station.

Another apparatus for wireless communication at a first UE is described. The apparatus may include means for transmitting a request for paging assistance to a second UE, configuring a first discontinuous reception cycle associated with an extended paging periodicity based on the transmitted request, and receiving paging information from the second UE in response to the configured first discontinuous reception cycle, where the paging information includes paging information from a base station.

A non-transitory computer-readable medium storing code for wireless communication at a first UE is described. The code may include instructions executable by a processor to transmit a request for paging assistance to a second UE, configure a first discontinuous reception cycle associated with an extended paging periodicity based on the transmitted request, and receive paging information from the second UE in response to the configured first discontinuous reception cycle, where the paging information includes paging information from a base station.

Some examples of the method, apparatuses, and non-transitory computer-readable medium described herein may further include operations, features, means, or instructions for identifying information corresponding to a second discontinuous reception cycle configured for the first UE, where the request for paging assistance includes the information corresponding to the second discontinuous reception cycle and an identification of the first UE. In some examples of the method, apparatuses, and non-transitory computer-readable medium described herein, the information corresponding to the second discontinuous reception cycle includes a paging periodicity that may be shorter than the extended paging periodicity, one or more paging occasions, an identifier of the second discontinuous reception cycle, or some combination thereof. In some examples of the method, apparatuses, and non-transitory computer-readable medium described herein, configuring the first discontinuous reception cycle may include operations, features, means, or instructions for skipping one or more paging occasions associated with the second discontinuous reception cycle.

In some examples of the method, apparatuses, and non-transitory computer-readable medium described herein, the received paging information from the second UE includes paging information from a base station during the skipped one or more paging occasions. Some examples of the method, apparatuses, and non-transitory computer-readable medium described herein may further include operations, features, means, or instructions for performing a random access channel procedure to establish a radio resource connection to the base station based on the received paging information, where the received paging information includes a connection request from the base station. Some examples of the method, apparatuses, and non-transitory computer-readable medium described herein may further include operations, features, means, or instructions for receiving updated system information based on the received paging information, where the received paging information indicates a system information update.

In some examples of the method, apparatuses, and non-transitory computer-readable medium described herein, one or more paging occasions associated with the second discontinuous reception cycle correspond to a subset of one or more paging occasions associated with a third discontinuous reception cycle configured for the second UE. In some examples of the method, apparatuses, and non-transitory computer-readable medium described herein, a first paging periodicity associated with the second discontinuous reception cycle corresponds to a multiple of a second paging periodicity associated with a third discontinuous reception cycle configured for the second UE. Some examples of the method, apparatuses, and non-transitory computer-readable medium described herein may further include operations, features, means, or instructions for transitioning to an active state during a paging occasion of the first discontinuous reception cycle based on the configured first discontinuous reception cycle, where the paging information may be received based on the transitioning.

In some examples of the method, apparatuses, and non-transitory computer-readable medium described herein, transmitting the request for paging assistance may include operations, features, means, or instructions for transmitting discontinuous reception cycle information configured by the base station. Some examples of the method, apparatuses, and non-transitory computer-readable medium described herein may further include operations, features, means, or instructions for receiving second paging information from the base station in response to the configured first discontinuous reception cycle. In some examples of the method, apparatuses, and non-transitory computer-readable medium described herein, the first discontinuous reception cycle may be associated with an active state and an idle state of the first UE. In some examples of the method, apparatuses, and non-transitory computer-readable medium described herein, the first discontinuous reception cycle may be associated with an active state and an inactive state of the first UE. In some examples of the method, apparatuses, and non-transitory computer-readable medium described herein, the request for paging assistance may be transmitted to the second UE using a device-to-device link between the first UE and the second UE, and the paging information may be received from the second UE using the device-to-device link.

A method of wireless communication at a second UE is described. The method may include receiving a request for paging assistance from a first UE, receiving first paging information from a base station based on the received request, and transmitting the received first paging information to the first UE based on the request.

An apparatus for wireless communication at a second UE is described. The apparatus may include a processor, memory coupled with the processor, and instructions stored in the memory. The instructions may be executable by the processor to cause the apparatus to receive a request for paging assistance from a first UE, receive first paging information from a base station based on the received request, and transmit the received first paging information to the first UE based on the request.

Another apparatus for wireless communication at a second UE is described. The apparatus may include means for receiving a request for paging assistance from a first UE, receiving first paging information from a base station based on the received request, and transmitting the received first paging information to the first UE based on the request.

A non-transitory computer-readable medium storing code for wireless communication at a second UE is described. The code may include instructions executable by a processor to receive a request for paging assistance from a first UE, receive first paging information from a base station based on the received request, and transmit the received first paging information to the first UE based on the request.

Some examples of the method, apparatuses, and non-transitory computer-readable medium described herein may further include operations, features, means, or instructions for monitoring a first set of one or more paging occasions based on the received request, where the first paging information may be received based on monitoring the first set of one or more paging occasions. Some examples of the method, apparatuses, and non-transitory computer-readable medium described herein may further include operations, features, means, or instructions for identifying the first set of one or more paging occasions based on the request, where the request includes an identification of the first UE and information corresponding to a first discontinuous reception cycle of the first UE, the information corresponding to the first discontinuous reception cycle including at least the first set of one or more paging occasions.

In some examples of the method, apparatuses, and non-transitory computer-readable medium described herein, a first paging periodicity associated with the first discontinuous reception cycle corresponds to a multiple of a second paging periodicity associated with a second discontinuous reception cycle configured for the second UE. Some examples of the method, apparatuses, and non-transitory computer-readable medium described herein may further include operations, features, means, or instructions for monitoring a second set of one or more paging occasions associated with a second discontinuous reception cycle of the second UE, and receiving second paging information from the base station based on monitoring the second set of one or more paging occasions.

In some examples of the method, apparatuses, and non-transitory computer-readable medium described herein, the first set of one or more paging occasions associated with first UE correspond to a subset of the second set of one or more paging occasions associated with the second UE. Some examples of the method, apparatuses, and non-transitory computer-readable medium described herein may further include operations, features, means, or instructions for storing the received first paging information in memory, and identifying a paging occasion associated with the first UE based on the request, where the stored first paging information may be transmitted to the first UE based on the identified paging occasion. Some examples of the method, apparatuses, and non-transitory computer-readable medium described herein may further include operations, features, means, or instructions for storing the received first paging information in memory, and receiving a communication from the first UE, where the stored first paging information may be transmitted to the first UE based on the received communication.

In some examples of the method, apparatuses, and non-transitory computer-readable medium described herein, the first paging information includes a connection request from the base station. In some examples of the method, apparatuses, and non-transitory computer-readable medium described herein, the first paging information indicates a system information update. In some examples of the method, apparatuses, and non-transitory computer-readable medium described herein, receiving the request for paging assistance may include operations, features, means, or instructions for receiving discontinuous reception cycle information for the first UE configured by the base station. Some examples of the method, apparatuses, and non-transitory computer-readable medium described herein may further include operations, features, means, or instructions for identifying a first set of one or more paging occasions skipped by the first UE, and identifying a second set of one or more paging occasions monitored by the first UE, where the first paging information may be received from the base station based on the first set of one or more paging occasions. In some examples of the method, apparatuses, and non-transitory computer-readable medium described herein, the request for paging assistance may be received from the first UE using a device-to-device link between the first UE and the second UE, and the paging information may be transmitted to the first UE using the device-to-device link.

A method of wireless communications at a base station is described. The method may include determining a second UE is assisting paging operations for a first UE, configuring a first set of one or more paging occasions for first paging information associated with the first UE based on the determination, and transmitting, to the second UE, the first paging information associated with the first UE based on the configured one or more paging occasions.

An apparatus for wireless communications at a base station is described. The apparatus may include a processor, memory coupled with the processor, and instructions stored in the memory. The instructions may be executable by the processor to cause the apparatus to determine a second UE is assisting paging operations for a first UE, configure a first set of one or more paging occasions for first paging information associated with the first UE based on the determination, and transmit, to the second UE, the first paging information associated with the first UE based on the configured one or more paging occasions.

Another apparatus for wireless communications at a base station is described. The apparatus may include means for determining a second UE is assisting paging operations for a first UE, configuring a first set of one or more paging occasions for first paging information associated with the first UE based on the determination, and transmitting, to the second UE, the first paging information associated with the first UE based on the configured one or more paging occasions.

A non-transitory computer-readable medium storing code for wireless communications at a base station is described. The code may include instructions executable by a processor to determine a second UE is assisting paging operations for a first UE, configure a first set of one or more paging occasions for first paging information associated with the first UE based on the determination, and transmit, to the second UE, the first paging information associated with the first UE based on the configured one or more paging occasions.

Some examples of the method, apparatuses, and non-transitory computer-readable medium described herein may further include operations, features, means, or instructions for identifying the second UE may be operating according to a first discontinuous reception cycle, and determining a second set of one or more paging occasions associated with the second UE based on the first discontinuous reception cycle, where the first set of one or more paging occasions may be configured based on the second set of one or more paging occasions. In some examples of the method, apparatuses, and non-transitory computer-readable medium described herein, a first paging periodicity associated with a second discontinuous reception cycle associated with the first UE corresponds to a multiple of a second paging periodicity associated with the first discontinuous reception cycle associated with the second UE. In some examples of the method, apparatuses, and non-transitory computer-readable medium described herein, the configured first set of one or more paging occasions associated with the first UE correspond to a subset of the second set of one or more paging occasions associated with the second UE.

Some examples of the method, apparatuses, and non-transitory computer-readable medium described herein may further include operations, features, means, or instructions for configuring downlink symbols to the second UE based on the configured first set of one or more paging occasions for first paging information associated with the first UE. Some examples of the method, apparatuses, and non-transitory computer-readable medium described herein may further include operations, features, means, or instructions for identifying a second set of one or more paging occasions skipped by the first UE, and identifying a third set of one or more paging occasions monitored by the first UE, where the first set of one or more paging occasions includes the second set of one or more paging occasions.

Some examples of the method, apparatuses, and non-transitory computer-readable medium described herein may further include operations, features, means, or instructions for configuring downlink symbols to the second UE based on the second set of one or more paging occasions for first paging information associated with the first UE, and configuring downlink symbols to the first UE based on the third set of one or more paging occasions. Some examples of the method, apparatuses, and non-transitory computer-readable medium described herein may further include operations, features, means, or instructions for performing a random access channel procedure to establish a radio resource connection to the first UE based on the third set of one or more paging occasions, where the first paging information includes a connection request.

DETAILED DESCRIPTION

Figure 1:
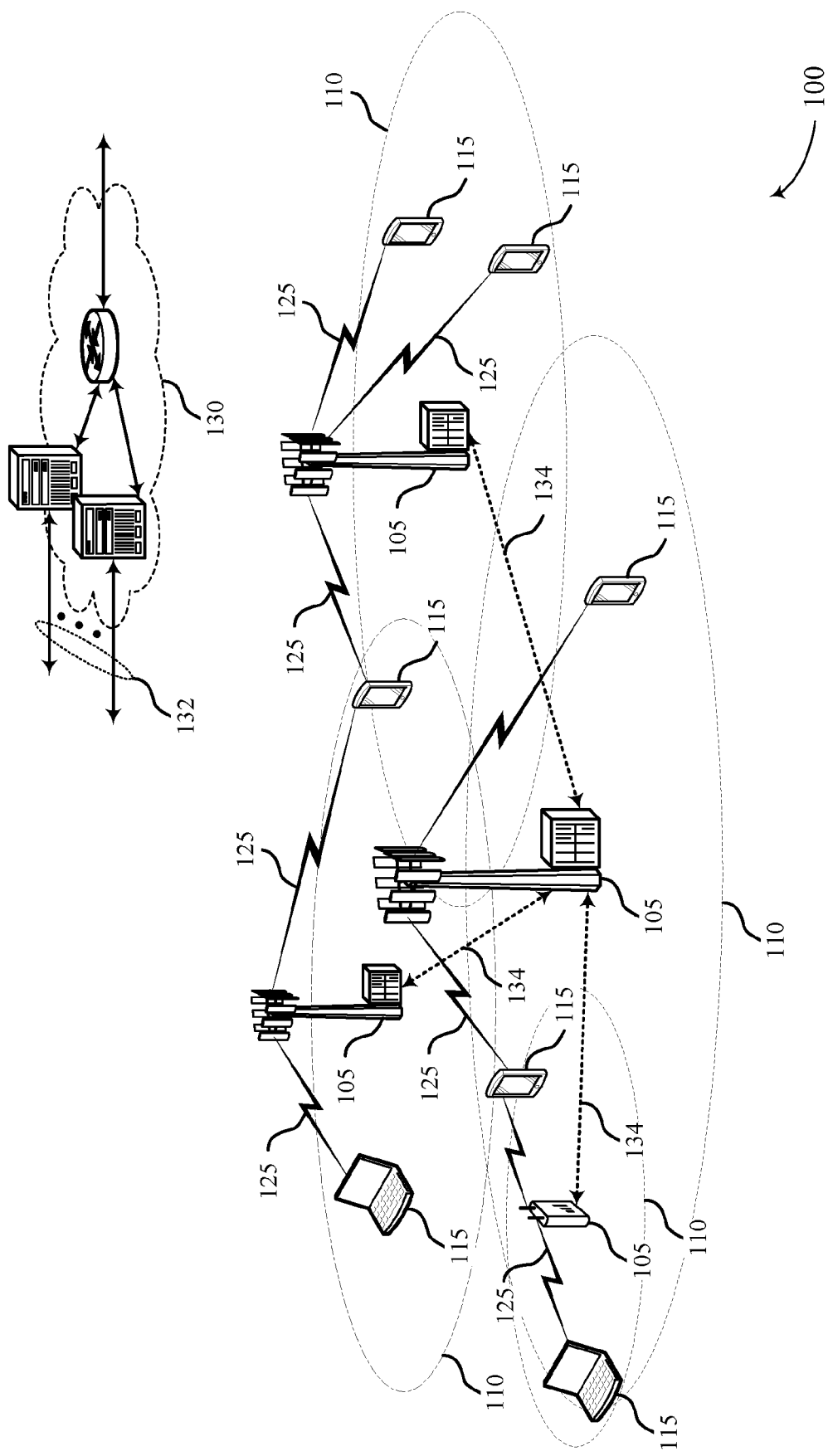
FIG. 1 illustrates an example of a system for wireless communications that supports discontinuous reception (DRX) cycle extension and paging with external assistance in accordance with aspects of the present disclosure.

Some wireless communications systems may support low complexity user equipment (UEs) (e.g., which may be referred to as Light devices, New Radio (NR)-Light devices, low tier devices, Internet of Things (IoT) devices, etc.). A low complexity UE may also be referred to as a low tier UE for which some features, or premium features, may not be needed or useful. For example, low complexity UEs may include sensors (e.g., industrial sensors), cameras (e.g., video monitoring devices), wearable devices, IoT devices, low tier or relaxed devices, etc. Such low complexity UEs may be used in a variety of applications, including healthcare, smart cities, transportation and logistics, electricity distribution, process automation, and building automation. Low complexity UEs may communicate with a base station and operate in the same cell as other, non-low complexity UEs (e.g., which may be referred to as regular UEs, premium UEs, etc.). For example, in some cases, a low complexity UE may be connected to a network via a connection to a base station, in addition to being connected to other UEs (e.g., to one or more premium UEs) via device-to-device (e.g., sidelink) connections.

In some cases, a UE may operate in various modes in order to save battery power. For example, a UE may enter into a discontinuous reception (DRX) mode in which communications received by the UE are limited. A DRX mode may be applied in either a connected state (e.g., connected DRX (C-DRX)) or in an idle state (e.g., idle DRX (I-DRX)). In each case, the UE may limit its reception of communications to specified radio frames within a DRX cycle in order to conserve power. That is, a UE may operate in a DRX mode and may transition between low power states (e.g., sleep states or idle states) and reception states.

When a UE is in idle mode, the UE may thus operate according to an I-DRX cycle, such that the UE may operate in a low power state and may periodically monitor for paging messages (e.g., according to the I-DRX cycle). When the UE has pending messages, a base station may transmit a paging message to the UE (e.g., during a paging occasion of the I-DRX cycle). Upon reception of a paging message, the UE may transition to a full power state or an active state for data transfer between the base station and the UE (e.g., such that the base station may relay the pending messages). For example, a UE may operate in such an idle mode, and if a paging message is detected during a paging occasion of the I-DRX cycle the UE may establish a radio resource control (RRC) connection to the network.

According to the techniques described herein, low complexity UEs may leverage external assistance from other UEs (e.g., via device-to-device communications) to improve paging procedures. For example, a low complexity UE may be in communication with another UE (e.g., with a premium UE or more capable UE) via a device-to-device communication link (e.g., via sidelink), and the low complexity UE may leverage the device-to-device link to improve paging procedures performed by the low complexity UE (e.g., to simplify paging procedures, to realize increased power savings during paging procedures, etc.).

For instance, according to the techniques described herein, idle DRX cycles at a UE (e.g., at a low complexity UE) may be extended via leveraging of paging assistance from a second UE. For example, a low complexity UE may have a connection to a network (e.g., via a link to a base station) as well as a connection to another UE (e.g., via a device-to-device link to a regular UE or a non-low complexity UE). In cases where such a low complexity UE receives paging messages from the network, a UE associated with a device-to-device link of the low complexity UE may monitor paging messages on behalf of the low complexity UE. As such, the low complexity UE may extend its idle DRX cycle (e.g., for further power savings at the low complexity UE) as the assisting UE monitors paging information for the low complexity UE. The low complexity UE may thus operate according to the extended idle DRX cycle, and may receive paging information forwarded from the assisting UE (e.g., the assisting UE may forward paging information for the low complexity UE according to paging occasions of the extended idle DRX cycle of the low complexity UE).

Aspects of the disclosure are initially described in the context of a wireless communications system. Example paging diagrams and an example process flow illustrating aspects of the discussed techniques are then described. Aspects of the disclosure are further illustrated by and described with reference to apparatus diagrams, system diagrams, and flowcharts that relate to DRX cycle extension and paging with external assistance.

FIG. 1 illustrates an example of a wireless communications system 100 that supports DRX cycle extension and paging with external assistance in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Wireless communications system 100 may support low complexity UEs 140 (e.g., which may be referred to as Light devices, NR-Light devices, low tier devices, IoT devices, etc.). A low complexity UE 140 may also be referred to as a low tier UE for which some features, or premium features, may not be needed or useful. For example, low complexity UEs 140 may include smart devices, sensors (e.g., industrial sensors), cameras (e.g., video monitoring devices), wearable devices, IoT devices, low tier or relaxed devices, etc. Such low complexity UEs 140 may be used in a variety of applications, including healthcare, smart cities, transportation and logistics, electricity distribution, process automation, and building automation. Low complexity UEs 140 may communicate with a base station 105 and operate in the same cell as other, non-low complexity UEs (e.g., which may be referred to as regular UEs 115, premium UEs, etc.). For example, in some cases, a low complexity UE 140 may be connected to a network via a connection to a base station 105, in addition to being connected to other UEs 115 (e.g., to one or more premium UEs) via device-to-device (e.g., sidelink) connections.

While low complexity UEs 140 having relatively more limited capabilities may meet the requirements of, and support communications using, for example, narrowband Internet-of-Things (NB-IoT) and Long Term Evolution (LTE) for Machines (LTE-M), such limited capabilities may also pose additional challenges within wireless communications systems. That is, allowing low complexity UEs 140 to maintain their intended benefits (e.g., power savings, low cost/low complexity design, etc.) may result in challenges for certain operations such as paging procedures. For instance, a low complexity UE 140 may be configured for low power consumption. As such, frequent paging by a base station 105 (e.g., or frequent low complexity UE 140 waking for paging occasions) may undesirably consume power at the low complexity UE 140.

According to the techniques described herein, low complexity UEs 140 may leverage external assistance from other UEs 115 (e.g., via device-to-device communications) to improve paging procedures. For example, a low complexity UE 140 may be in communication with another UE 115 (e.g., with a premium UE or more capable UE) via a device-to-device communication link (e.g., via sidelink), and the low complexity UE 140 may leverage the device-to-device link to improve paging procedures performed by the low complexity UE 140 (e.g., to simplify paging procedures, to realize increased power savings during paging procedures, etc.).

For instance, according to the techniques described herein, idle DRX cycles at a UE (e.g., at a UE 115 and/or at a low complexity UE 140) may be extended via leveraging of paging assistance from a second UE 115. For example, a low complexity UE 140 may have a connection to a network (e.g., via a link to a base station 105) as well as a connection to another UE 115 (e.g., via a device-to-device link to a regular UE or a non-low complexity UE). In cases where such a low complexity UE 140 receives paging messages from the network, a UE 115 associated with a device-to-device link of the low complexity UE 140 may monitor paging messages on behalf of the low complexity UE 140. As such, the low complexity UE 140 may extend its idle DRX cycle (e.g., for further power savings at the low complexity UE 140) as the assisting UE 115 monitors paging information for the low complexity UE 140. The low complexity UE 140 may thus operate according to the extended idle DRX cycle, and may receive paging information forwarded from the assisting UE 115 (e.g., the assisting UE 115 may forward paging information for the low complexity UE 140 according to paging occasions of the extended idle DRX cycle of the low complexity UE 140).

Figure 2:
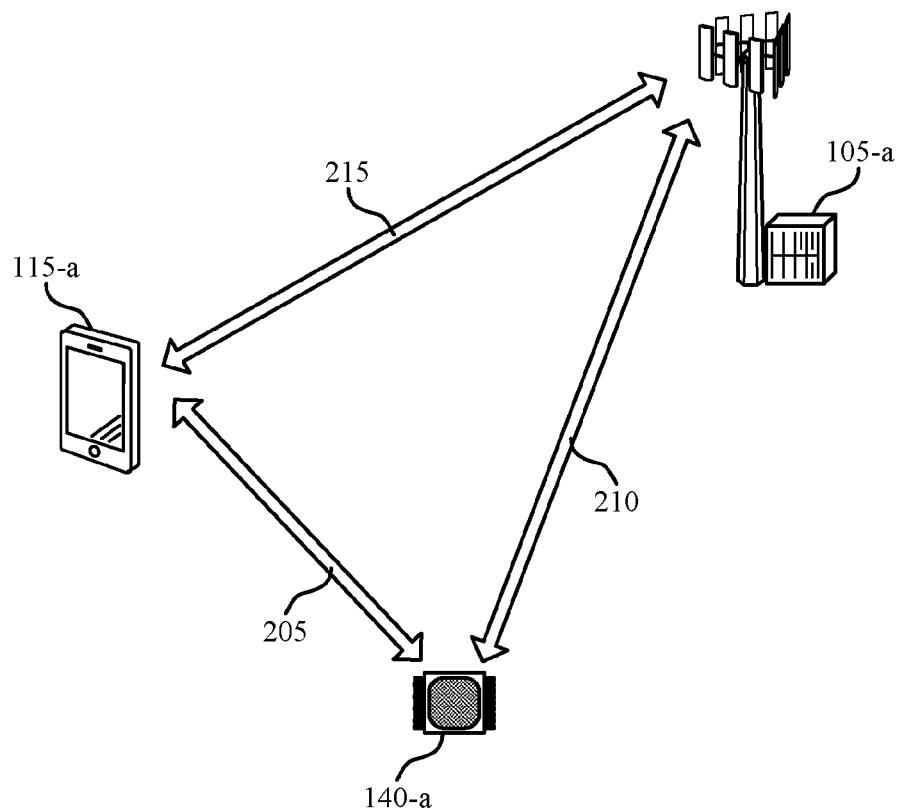
FIG. 2 illustrates an example of a wireless communications system that supports DRX cycle extension and paging with external assistance in accordance with aspects of the present disclosure.

FIG. 2 illustrates an example of a wireless communications system 200 that supports DRX cycle extension and paging with external assistance in accordance with aspects of the present disclosure. In some examples, wireless communications system 200 may implement aspects of wireless communications system 100. For example, wireless communications system 200 may include a base station 105-a, a UE 115-a, and a low complexity UE 140-a (e.g., a smart watch), which may be examples of the corresponding devices described with reference to FIG. 1. Further, as described herein, low complexity UE 140-a may generally include or refer to a Light device, a NR-Light device, a low tier device, an IoT device, a smart device, a sensor, a camera, a wearable device, etc.

Low complexity UEs 140 may be designed for low cost, low power consumption, etc. For example, low complexity UE 140s UEs 140 may be designed for wireless sensor applications such as pressure sensors, humidity sensors, thermometers, motion sensors, accelerometers, etc. In some cases, low complexity UEs 140 may be designed for wearable device applications such as smart watches, rings, eHealth related devices, medical monitoring devices, fitness or biological monitoring devices, etc. As such, low complexity UEs 140 may be smaller in size and have lower battery capacity compared to regular UEs 115 (e.g., compared to mobile phones, tablet devices, etc.). As such, a low complexity UE 140 may be designed to reduce device complexity and operation procedures of the low complexity UE 140. According to the techniques described herein, a low complexity UE 140 may leverage (e.g., use) external assistance from other UEs 115 (e.g., based on device-to-device communication) in order to extend DRX cycles when a low complexity UE 140 is not connected to the network (e.g., when a low complexity UE 140 is in idle mode). The described techniques may provide a paging mechanism that supports such extended DRX cycles.

For example, low complexity UE 140-a may be capable of device-to-device communication and may thus maintain links to other UEs 115 as well as links to base stations 105. In the example of FIG. 2, UE 140-a may maintain a link 205 (e.g., which may be referred to as a device-to-device link, a sidelink, a PC5 link, etc.) to UE 115-a as well as a link 210 (e.g., which may be referred to as a link to the cellular air interface, a Uu interface, etc.) to base station 105-a. In some cases, low complexity UE 140-a may use link 205 to extend its communication coverage, increase channel throughput to the cellular network, etc. (e.g., via communications through link 215 that may be forwarded by UE 115-a through link 205, via communications through link 205 that may be forwarded by UE 115-a through link 215, etc.). For example, UE 115-a may be connected to the base station 105-a via link 215 (e.g., which may be referred to as a link to the cellular air interface, a Uu interface, etc.), and may provide forwarding operations for communications between low complexity UE 140-a and base station 105-a. Low complexity UE 140-a may maintain both link 210 and link 205 because the coverage of the cellular network (e.g., the coverage via link 210) may be broader than the coverage via link 205. Further, low complexity UE 140-a may maintain both link 210 and link 205 because communications via link 205 may be associated with lower power consumption by the low complexity UE 140-a.

When low complexity UE 140-a is in idle mode, low complexity UE 140-a may operate in a sleep mode (e.g., a majority of the time) to conserve power. For example, in idle mode low complexity UE 140-a may power down some radio frequency circuitry in a low power state (e.g., in a sleep state) in order to conserve power. A network (e.g., base station 105-a) may send paging message to low complexity UE 140-a in cells of the tracking area for the low complexity UE 140-a. For example, base station 105-a may transmit paging messages to low complexity UE 140-a while the low complexity UE 140-a is in an idle mode in order to inform the low complexity UE 140-a of an incoming connection request, of system information update, or a message from a public warning system, etc.

As such, low complexity UE 140-a may periodically wakeup during paging occasions (e.g., during paging occasions of an I-DRX cycle) to detect such paging messages. If a paging message is detected, low complexity UE 140-a may establish a RRC connection to the network (e.g., low complexity UE 140-a may perform a RRC procedure with base station 105-a) in response to the connection request (e.g., that may be indicated by the detected paging message). In some cases, the paging occasion may be determined by an identifier of the UE (UE_ID), and longer paging periodicity may result in more power savings by the low complexity UE 140-a. The techniques described herein may be applicable to paging and DRX procedures for UE idle states and UE inactive states. The techniques described herein may provide for extending of low complexity UE 140 idle DRX cycles (e.g., I-DRX cycles) for further power savings.

If low complexity UE 140-a is capable of communicating with a second UE 115-a and the low complexity UE 140-a also receives paging messages from base station 105-a, the second UE 115-a may monitor page messages in page occasions where the network (e.g., base station 105-a) sends paging messages to the low complexity UE 140-a. Such may provide for more robust paging message reception for the low complexity UE 140-a (e.g., especially when the low complexity UE 140-a has less receive (Rx) antennas and is more vulnerable to weak coverage of the network). That is, the described techniques (e.g., UE 115-a forwarding of paging messages for low complexity UE 140-a) may provide more robust paging message reception for low complexity UE 140-a, as paging messages received over link 205 (e.g., a device-to-device link) may be more reliable (e.g., as communications over link 205 may be more reliable for low complexity UE 140-a compared to communications over link 210). Further, the described techniques may provide for DRX cycle extension (e.g., for low complexity UE 140-a) by skipping wakeups to save more power.

In some cases, low complexity UE 140-a may send its UE_ID and idle DRX configuration information to the second UE 115-a so that the second UE 115-a may determine the paging occasion for the low complexity UE 140-a and receive paging messages for the low complexity UE 140-a from the network. For example, low complexity UE 140-a may send its UE_ID and idle DRX configuration information such that UE 115-a may determine which paging occasions will be skipped by the low complexity UE 140-a (e.g., and thus determine which paging occasions the UE 115-a will monitor on behalf of the low complexity UE 140-a). Further, the UE 115-a may identify paging messages intended for the low complexity UE 140-a based on the received UE_ID of the low complexity UE 140-a. For example, base station 105-a may send paging messages for the low complexity UE 140-a that are identifiable as being for the low complexity UE 140-a based on including the UE_ID of the low complexity UE 140-a in the paging message. As such, UE 115-a may monitor for paging messages during paging occasions (e.g., identified based on the idle DRX configuration information of the low complexity UE 140-a), and UE 115-a may store and forward paging messages intended for the low complexity UE 140-a (e.g., based on whether paging messages identified during the monitored paging occasions are associated with the UE_ID of the low complexity UE 140-a).

In some cases, the low complexity UE 140-a may send paging occasion information (e.g., indices of paging occasions the UE 115-a is to monitor) to the UE 115-a (e.g., and the low complexity UE 140-a may not necessarily include the UE_ID of the low complexity UE 140-a). In such cases, UE 115-a may receive any paging messages transmitted by base station 105-a during the indicated paging occasions, and may forward the received paging messages to low complexity UE 140-a (e.g., regardless of the UE_ID, for all UE_IDs, etc.). The low complexity UE 140-a may then parse the paging messages for any paging messages intended for the low complexity UE 140-a (e.g., based on the UE_ID of the low complexity UE 140-a and UE_IDs associated with the received paging messages). Such may provide for improved security, as the low complexity UE 140-a may not necessarily have to communicate UE_ID information to the UE 115-a.

After sending such a request to UE 115-a (e.g., after sending DRX configuration information, paging occasion information, etc.), low complexity UE 140-*a* may skip some paging occasions and remain in a low power state for skipped paging occasions in order to save more power at the low complexity UE 140-*a*. For a TDD system, the network (e.g., base station 105-*a*) may configure downlink symbols to UE 115-*a* where the second UE 115-*a* receives paging messages for the low complexity UE 140-*a*.

In some examples, if the second UE 115-*a* is also in an idle state, the network (e.g., base station 105-*a*) may send paging messages (e.g., paging messages for UE 115-*a* and paging messages for low complexity UE 140-*a*) in the same occasions (e.g., such that the UE 115-*a* may receive paging messages for both the UE 115-*a* and the low complexity UE 140-*a*. For example, the network may identify that UE 115-*a* is performing paging assistance for low complexity UE 140-*a* (e.g., the UE 115-*a* may forward the request from the low complexity UE 140-*a* to base station 105-*a*, the UE 115-*a* may send a separate indication that the UE 115-*a* is performing paging assistance for low complexity UE 140-*a*, the low complexity UE 140-*a* may indicate to base station 105-*a* that it has a device-to-device link 205 to UE 115-*a*, etc.), and the network may configure paging occasions, transmit paging messages, configure downlink symbols, etc. accordingly.

In some cases, paging occasions where the second UE 115-*a* receives paging messages for the low complexity UE 140-*a* can be a subset of paging occasions for the second UE 115-*a* to receive paging messages for the second UE 115-*a* itself, due to the longer paging periodicity of the low complexity UE 140-*a*. That is, paging occasions for the low complexity UE 140-*a* may be a subset of the paging occasions for the UE 115-*a*, such that UE 115-*a* may monitor its own paging occasions and on some of those paging occasions paging messages for the low complexity UE 140-*a* may be transmitted by base station 105-*a*. In some cases, the second UE 115-*a* may receive low complexity UE 140-*a* paging message within its own paging occasions but based on low complexity UE 140-*a* paging periodicity. In such cases, the paging periodicity of low complexity UE 140-*a* may be a multiple of the second UE 115-*a* paging periodicity.

In some cases, paging occasions may be determined based on UE_ID. In such cases, the network may not necessarily use the original paging occasions for the low complexity UE 140-*a* if they are not aligned with the paging occasions for the UE 115-*a*. That is, UE 115-*a* may operate in an idle mode, and paging occasions for low complexity UE 140-*a* may, in some cases, be reconfigured by the network such that the paging information for low complexity UE 140-*a* is transmitted during paging occasions of the UE 115-*a*. In some cases, monitoring paging messages for the low complexity UE 140-*a* in paging occasions of the second UE 115-*a* may avoid additional power consumption for the UE 115-*a* in idle state.

In some examples, once the UE 115-*a* receives paging messages for the low complexity UE 140-*a*, the UE 115-*a* may store (e.g., save) the paging messages for low complexity UE 140-*a* in memory of the UE 115-*a*. When low complexity UE 140-*a* wakes up, low complexity UE 140-*a* may communicate with UE 115-*a* and may receive paging messages (e.g., missed paging messages, paging messages transmitted by base station 105-*a* during paging occasions skipped by the low complexity UE 140-*a*, paging messages that UE 115-*a* stored in memory, etc.). In cases where the missed paging messages indicate a connection request from the network, the low complexity UE 140-*a* may perform a random access procedure to establish a RRC connection to the network (e.g., for many low complexity UE 140-*a* use cases, such as smart wearables, there may be no voice call from other UEs and the connection request may be caused by data transmission). In cases where the missed paging messages indicate system information update, the low complexity UE 140-*a* may receive the updated system information.

In some cases, the low complexity UE 140-*a* may transmit actual DRX cycle information configured by the network which may result in a longer DRX cycle and more sleep/power saving that that than is allowed by the network DRX configuration. In such cases, UE 115-*a* may know the paging occasions where the low complexity UE 140-*a* decides not to wake up, and the UE 115-*a* may only receive paging messages for low complexity UE 140-*a* in paging occasions where the low complexity UE 140-*a* does not wake up. That is, in some examples, UE 115-*a* may identify paging occasions where low complexity UE 140-*a* does not wakeup and the UE 115-*a* may monitor for paging messages for low complexity UE 140-*a* during such paging occasions. However, UE 115-*a* may not necessarily monitor for paging occasions where the low complexity UE 140-*a* wakes up.

Any aspect of the techniques described herein may be applied for idle state (e.g., I-DRX), inactive state (e.g., inactive state DRX), connected state (e.g., C-DRX), or any low power state by analogy, without departing from the scope of the present disclosure.

Figure 3A:
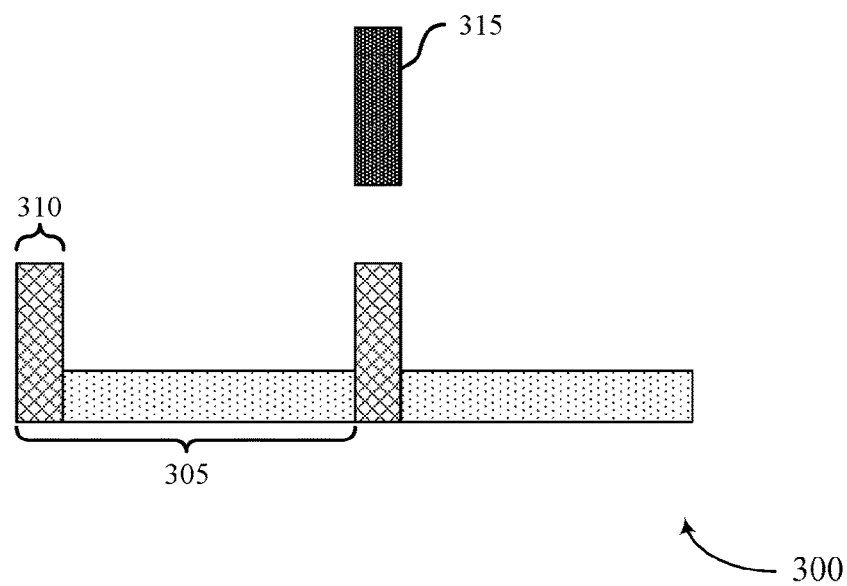
FIGS. 3A and 3B illustrate example paging diagrams that support DRX cycle extension and paging with external assistance in accordance with aspects of the present disclosure.
Figure 3B:
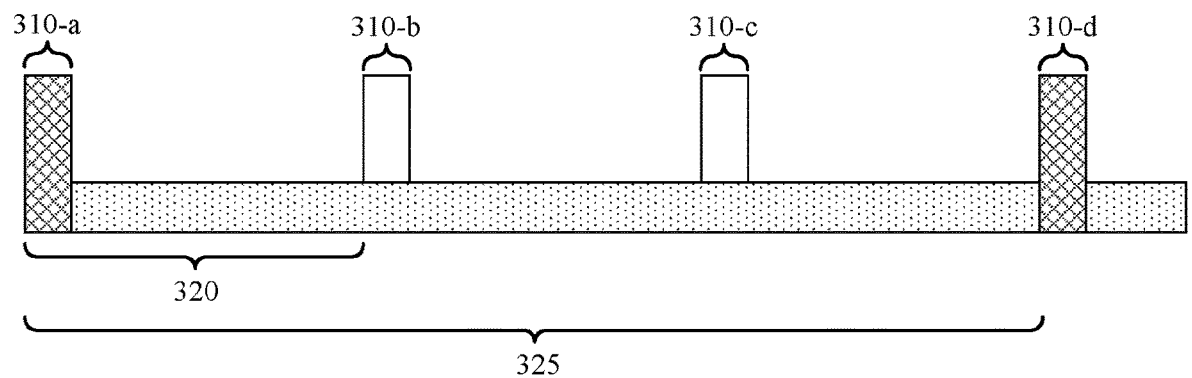

FIGS. 3A and 3B illustrate example paging diagram 300 and example paging diagram 301, respectively, that may support DRX cycle extension and paging with external assistance in accordance with aspects of the present disclosure. In some examples, paging diagram 300 and paging diagram 301 may implement aspects of wireless communications system 100 and/or wireless communications system 200. For example, paging diagram 300 and paging diagram 301 may illustrate aspects of I-DRX cycles of a low complexity UE 140, aspects of paging by a base station 105, etc.

FIG. 3A illustrates example paging diagram 300 that may illustrate a paging periodicity 305 (e.g., of a I-DRX cycle). For example, a device (e.g., a UE 115, a low complexity UE 140, etc.) may operate in an idle mode and may wakeup according to some paging periodicity. For example paging occasions 310 may be configured periodically according to the paging periodicity 305, and devices may wake up for each paging occasion 310 to monitor for paging messages 315.

FIG. 3B illustrates example paging diagram 301 that may illustrate a configured paging periodicity 320 (e.g., of a I-DRX cycle) as well as an extended paging periodicity 325 (e.g., of an extended I-DRX cycle). For example, a device (e.g., a low complexity UE 140, etc.) may operate in an idle mode and may wakeup according to extended paging periodicity 325 using the techniques described herein. For example, a low complexity UE 140 may be configured with a I-DRX cycle according to some configured paging periodicity 320, and the low complexity UE 140 may extend the I-DRX cycle via paging assistance by another UE 115, as described herein.

In the example paging diagram 301, a low complexity UE 140 may initially be configured with a DRX cycle that includes paging occasion 310-*a*, paging occasion 310-*b*, paging occasion 310-*c*, and paging occasion 310-*d* (e.g., according to paging periodicity 320). As described herein, the low complexity UE 140 may transmit a request for paging assistance to a second UE 115, and the low complexity UE 140 may configure an extended DRX cycle based on the transmitted request. In the present example, the extended DRX cycle may include paging occasion 310-*a* and paging occasion 310-*d* (e.g., and the low complexity UE 140 may skip paging occasion 310-*b* and paging occasion 310-*c*).

In some cases, the request for paging assistance may include the initial configured DRX cycle information (e.g., the initial configured paging periodicity 320, the initial paging occasions 310-*a*, 310-*b*, 310-*c*, and 310-*d*, etc.), the extended DRX cycle information (e.g., the extended paging periodicity 325, the paging occasions 310-*a* and 310-*d*, etc.), indices of the monitored paging occasions (e.g., indices of paging occasion 310-*a* and 310-*d*), indices of the skipped paging occasions (e.g., indices of paging occasion 310-*b* and 310-*c*), an identifier of the low complexity UE 140 (e.g., a UE_ID of low complexity UE 140), or any combination thereof. In some cases, some or all of information pertaining to the configured DRX cycle, the extended DRX cycle, etc. may be previously known to an assisting UE 115 (e.g., via prior signaling between the assisting UE 115 and the low complexity UE 140, via signaling from the network, etc.), such that the request may include an indication of requesting paging assistance and the assisting UE 115 may implicitly know how the low complexity UE 140 is extending its DRX cycle.

Figure 4:
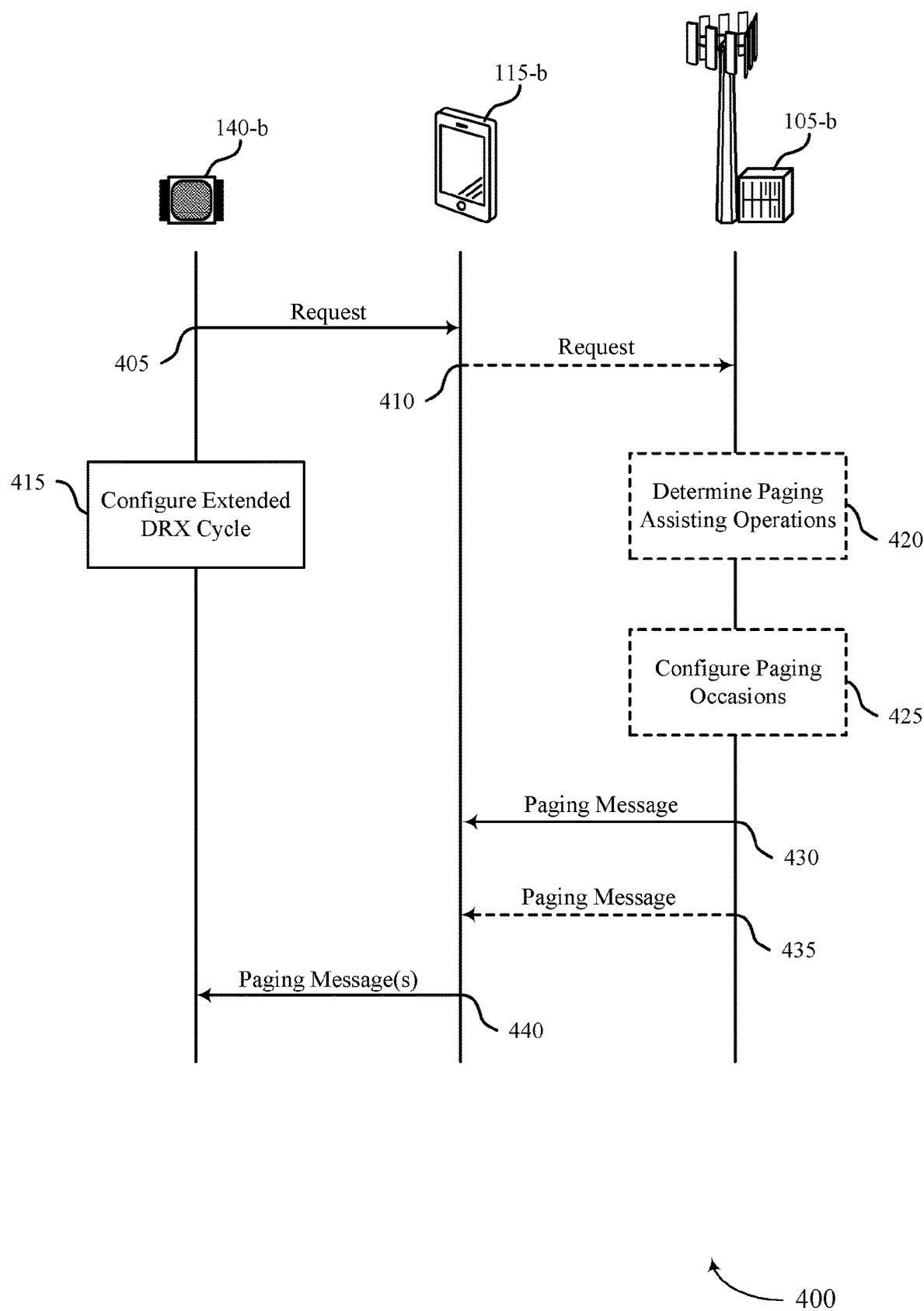
FIG. 4 illustrates an example of a process flow that supports DRX cycle extension and paging with external assistance in accordance with aspects of the present disclosure.

FIG. 4 illustrates an example of a process flow 400 that supports DRX cycle extension and paging with external assistance in accordance with aspects of the present disclosure. In some examples, process flow 400 may implement aspects of wireless communications system 100, wireless communications system 200, example paging diagram 300, and/or example paging diagram 301. For example, process flow 400 may include a base station 105-*b*, a UE 115-*b*, and a low complexity UE 140-*b* (e.g., a smart watch), which may be examples of the corresponding devices described with reference to FIGS. 1-3. Further, as described herein, low complexity UE 140-*b* may generally include or refer to a Light device, a NR-Light device, a low tier device, an IoT device, a smart device, a sensor, a camera, a wearable device, etc. The process flow 400 includes functions and communications implemented by base station 105-*b*, UE 115-*b*, and low complexity UE 140-*b* in the context of idle DRX extension (e.g., for more efficient paging procedures, for more power savings at low complexity UE 140-*b*, etc.).

In the following description of the process flow 400, the operations between base station 105-*b*, UE 115-*b*, and low complexity UE 140-*b* may be transmitted in a different order than the order shown, or the operations may be performed in different orders or at different times. Certain operations may also be left out of the process flow 400, or other operations may be added to the process flow 400. It is to be understood that while base station 105-*b*, UE 115-*b*, and low complexity UE 140-*b* are shown performing a number of the operations of process flow 400, any wireless device may perform the operations shown.

At 405, low complexity UE 140-*b* may transmit a request for paging assistance to UE 115-*b*. For example, low complexity UE 140-*b* may identify information corresponding to a second DRX cycle configured for low complexity UE 140-*b* (e.g., a regular or configured DRX cycle), where the request for paging assistance may include the information corresponding to the second DRX cycle and an identification of low complexity UE 140-*b*. In some cases, the information corresponding to the second DRX cycle may include a paging periodicity that is shorter than an extended paging periodicity, may include one or more paging occasions, may include an identifier of the second DRX cycle, etc. In some examples, the request for paging assistance may be transmitted to UE 115-*b* using a device-to-device link between low complexity UE 140-*b* and UE 115-*b*.

At 410, UE 115-*b* may, in some cases (e.g., to inform base station 105-*b* that the UE 115-*b* is performing paging assistance operations on behalf of the low complexity UE 140-*b*), transmit the request to base station 105-*b*.

At 415, low complexity UE 140-*b* may configure a first DRX cycle associated with an extended paging periodicity based on the transmitted request. In some cases, configuring the first DRX cycle (e.g., the extended DRX cycle) may include skipping one or more paging occasions associated with the second DRX cycle (e.g., skipping one or more paging occasions associated with the configured DRX cycle).

At 420, base station 105-*b* may, in some cases, determine UE 115-*b* is assisting paging operations for low complexity UE 140-*b* (e.g., based on a forwarded request received at 410, based on other signaling from the low complexity UE 140-*b*, based on a lack of responsiveness or missed paging occasions by the low complexity UE 140-*b*, etc.).

At 425, base station 105-*b* may, in some cases, configure a first set of one or more paging occasions for first paging information associated with low complexity UE 140-*b* based on the determination. For example, as described herein, in some cases the base station 105-*b* may align paging occasions of the low complexity UE 140-*b* with paging occasions of the UE 115-*b*. In some cases, the one or more paging occasions associated with the second DRX cycle may correspond to a subset of one or more paging occasions associated with a third DRX cycle configured for UE 115-*b*. In some cases, a first paging periodicity associated with the second DRX cycle may correspond to a multiple of a second paging periodicity associated with a third DRX cycle configured for UE 115-*b*.

At 430, base station 105-*b* may transmit paging information for the low complexity UE 140-*b* (e.g., during a first paging occasion that is skipped by the low complexity UE 140-*b* due to the extended DRX cycle of the low complexity UE 140-*b*). At 435, in some cases, base station base station 105-*b* may transmit paging information for the low complexity UE 140-*b* (e.g., during a second paging occasion that is skipped by the low complexity UE 140-*b* due to the extended DRX cycle of the low complexity UE 140-*b*). Further, at 430 and 435, UE 115-*b* may monitor the first set of one or more paging occasions (e.g., the paging occasions associated with the paging messages that may be transmitted at 430 and 435) based on the request received at 405, where the first paging information is received based on monitoring the first set of one or more paging occasions. In some examples, UE 115-*b* may store paging messages received at 430 and/or 435 in memory while the low complexity UE 140-*b* remains in the sleep state. Further, in some examples (e.g., when the UE 115-*b* is in an idle mode) UE 115-*b* may also monitor for its own paging information according to its own DRX cycle (e.g., according to the third DRX cycle).

At 440, low complexity UE 140-*b* may receive paging information from UE 115-*b* (e.g., in response to the configured first DRX cycle, where the paging information includes paging information from base station 105-*b*). For example, low complexity UE 140-*b* may receive paging information from UE 115-*b* in a paging occasion of the extended DRX cycle. In some cases, UE 115-*b* may be aware of the paging occasion of the extended DRX cycle, and may transmit the paging information to the low complexity UE 140-*b* during the paging occasion of the extended DRX cycle. In some cases, low complexity UE 140-*b* may wakeup and communicate with the UE 115-*b*, and the UE 115-*b* may transmit the paging information to the low complexity UE 140-*b* based on the communication. In some cases, the received paging information from UE 115-*b* may include paging information from base station 105-*b* during the skipped paging occasions. In some cases, the paging information is received from UE 115-*b* using the device-to-device link between the UE 115-*b* and the low complexity UE 140-*b*.

Upon receipt of the paging information, the low complexity UE 140-*b* may perform random access procedures with base station 105-*b*, receive updated system information from base station 105-*b*, receive subsequent data transfer form base station 105-*b*, etc. (e.g., based on, or in accordance with, the paging information). For example, in some cases, the low complexity UE 140-*b* may perform a RRC procedure to establish a RRC connection to base station 105-*b* based on the received paging information, where the received paging information includes a connection request from base station 105-*b*. In some cases, the low complexity UE 140-*b* may receive updated system information based on the received paging information, where the received paging information indicates a system information update.

Figure 5:
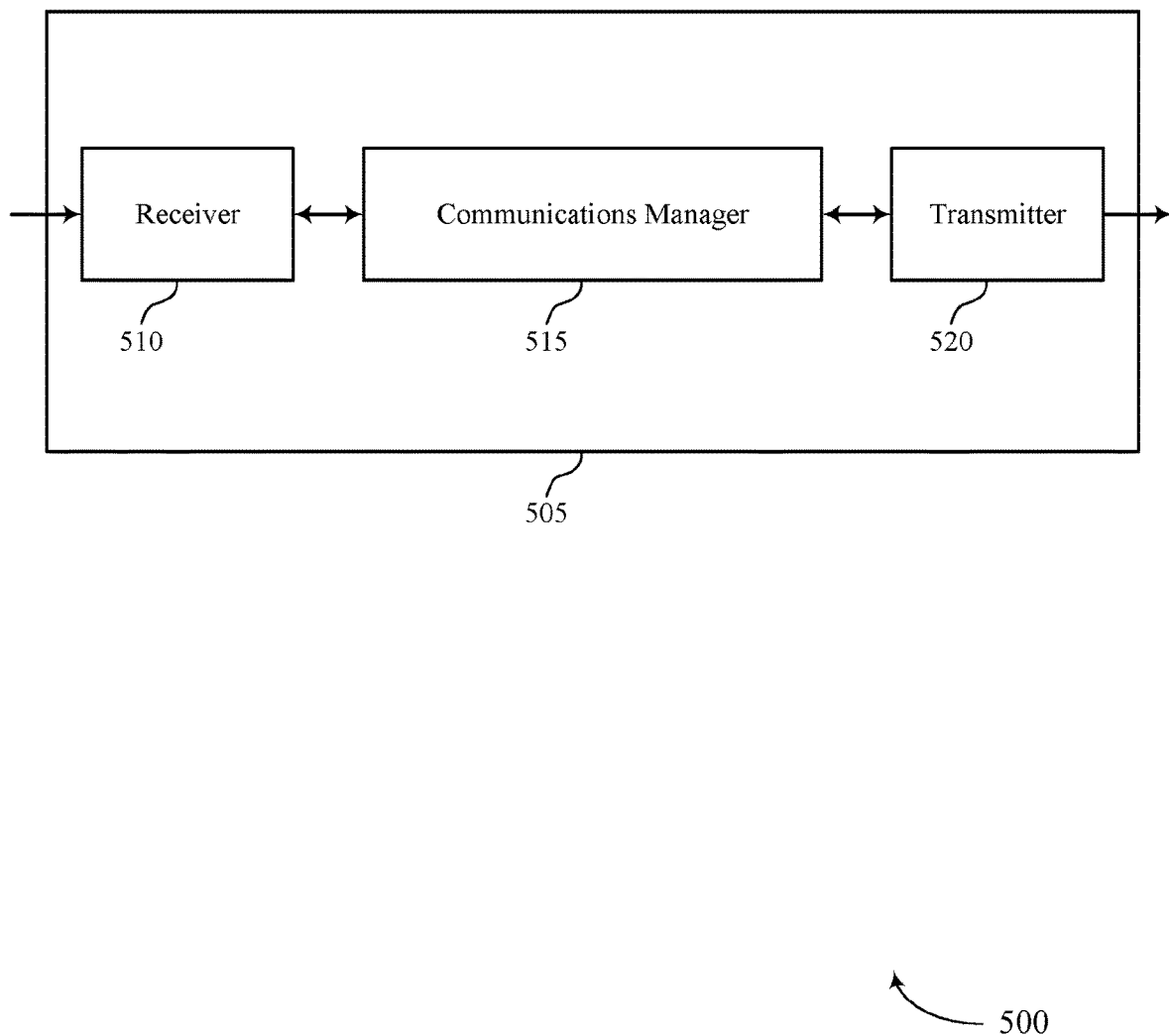
FIGS. 5 and 6 show block diagrams of devices that support DRX cycle extension and paging with external assistance in accordance with aspects of the present disclosure.

FIG. 5 shows a block diagram 500 of a device 505 that supports DRX cycle extension and paging with external assistance in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to DRX cycle extension and paging with external assistance, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive a request for paging assistance from a first UE, receive first paging information from a base station based on the received request, and transmit the received first paging information to the first UE based on the request. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
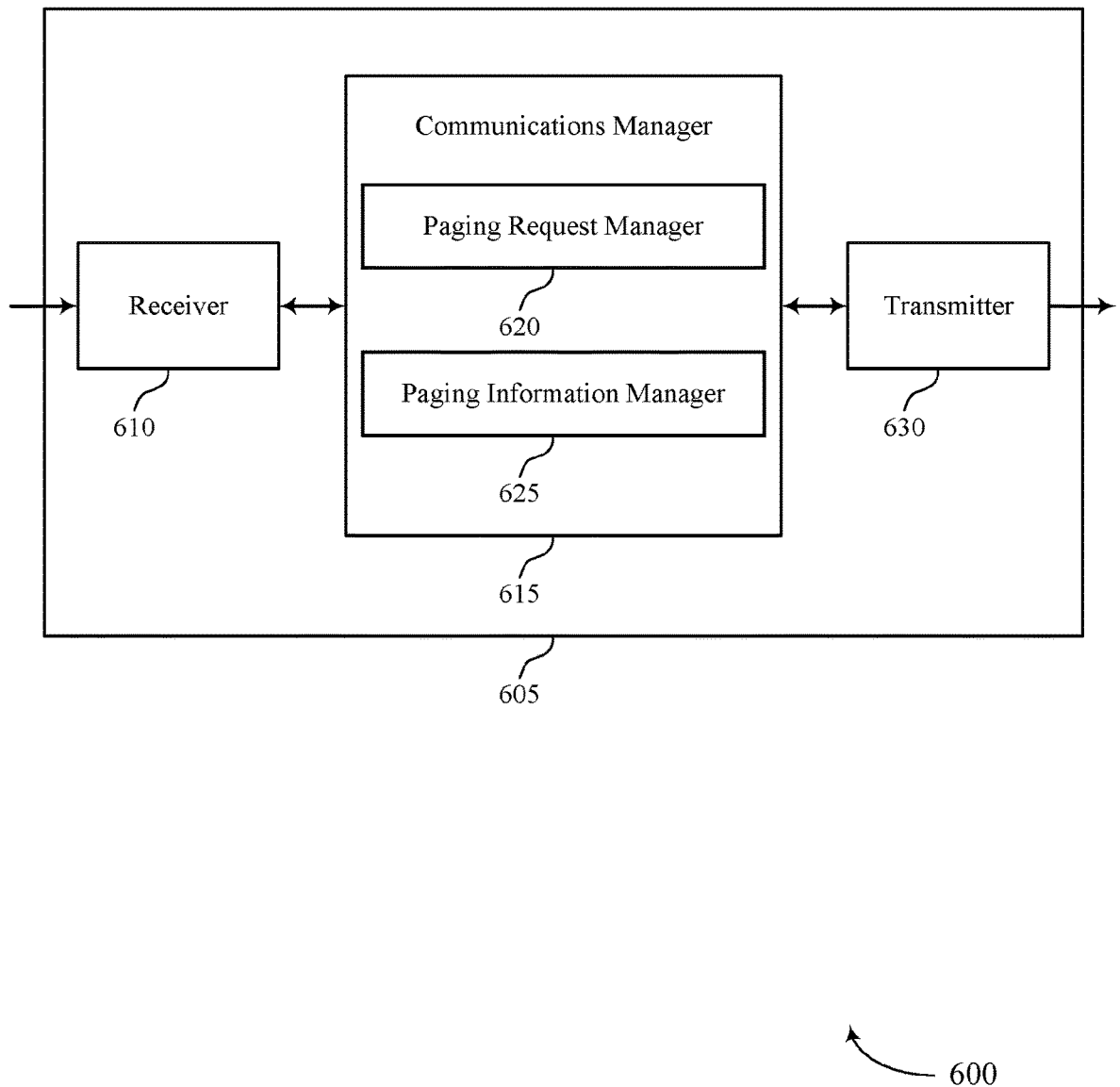

FIG. 6 shows a block diagram 600 of a device 605 that supports DRX cycle extension and paging with external assistance in accordance with aspects of the present disclosure. The device 605 may be an example of aspects of a device 505, or a UE 115 as described herein. The device 605 may include a receiver 610, a communications manager 615, and a transmitter 630. The device 605 may also include a processor. Each of these components may be in communication with one another (e.g., via one or more buses).

The receiver 610 may receive information such as packets, user data, or control information associated with various information channels (e.g., control channels, data channels, and information related to DRX cycle extension and paging with external assistance, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a paging request manager 620 and a paging information manager 625. The communications manager 615 may be an example of aspects of the communications manager 810 described herein.

The paging request manager 620 may receive a request for paging assistance from a first UE. The paging information manager 625 may receive first paging information from a base station based on the received request and transmit the received first paging information to the first UE based on the request.

The transmitter 630 may transmit signals generated by other components of the device 605. In some examples, the transmitter 630 may be collocated with a receiver 610 in a transceiver module. For example, the transmitter 630 may be an example of aspects of the transceiver 820 described with reference to FIG. 8. The transmitter 630 may utilize a single antenna or a set of antennas.

Figure 7:
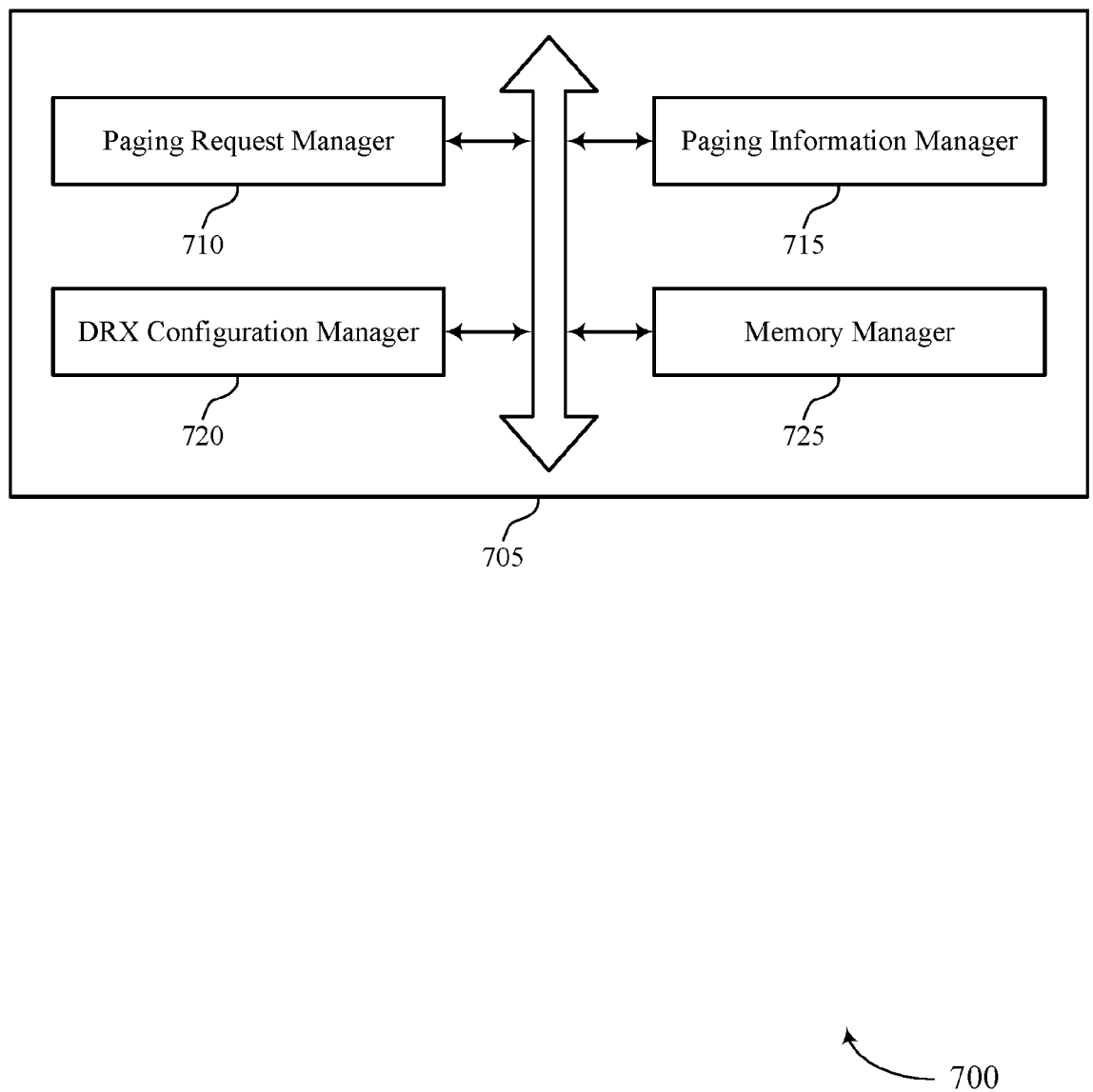
FIG. 7 shows a block diagram of a communications manager that supports DRX cycle extension and paging with external assistance in accordance with aspects of the present disclosure.

FIG. 7 shows a block diagram 700 of a communications manager 705 that supports DRX cycle extension and paging with external assistance in accordance with aspects of the present disclosure. The communications manager 705 may be an example of aspects of a communications manager 515, a communications manager 615, or a communications manager 810 described herein. The communications manager 705 may include a paging request manager 710, a paging information manager 715, a DRX configuration manager 720, and a memory manager 725. Each of these modules may communicate, directly or indirectly, with one another (e.g., via one or more buses).

The paging request manager 710 may receive a request for paging assistance from a first UE. In some examples, the paging request manager 710 may receive discontinuous reception cycle information for the first UE configured by the base station. In some examples, the paging request manager 710 may identify a first set of one or more paging occasions skipped by the first UE. In some examples, the paging request manager 710 may identify a second set of one or more paging occasions monitored by the first UE, where the first paging information is received from the base station based on the first set of one or more paging occasions. In some cases, the request for paging assistance is received from the first UE using a device-to-device link between the first UE and the second UE, and the paging information is transmitted to the first UE using the device-to-device link.

The paging information manager 715 may receive first paging information from a base station based on the received request. In some examples, the paging information manager 715 may transmit the received first paging information to the first UE based on the request. In some examples, the paging information manager 715 may monitor a first set of one or more paging occasions based on the received request, where the first paging information is received based on monitoring the first set of one or more paging occasions. In some examples, identifying the first set of one or more paging occasions based on the request, where the request includes an identification of the first UE and information corresponding to a first discontinuous reception cycle of the first UE, the information corresponding to the first discontinuous reception cycle including at least the first set of one or more paging occasions.

In some examples, the paging information manager 715 may receive second paging information from the base station based on monitoring the second set of one or more paging occasions. In some examples, the paging information manager 715 may identify a paging occasion associated with the first UE based on the request, where the stored first paging information is transmitted to the first UE based on the identified paging occasion. In some examples, the paging information manager 715 may receive a communication from the first UE, where the stored first paging information is transmitted to the first UE based on the received communication. In some cases, a first paging periodicity associated with the first discontinuous reception cycle corresponds to a multiple of a second paging periodicity associated with a second discontinuous reception cycle configured for the second UE. In some cases, the first paging information includes a connection request from the base station. In some cases, the first paging information indicates a system information update.

The DRX configuration manager 720 may monitor a second set of one or more paging occasions associated with a second discontinuous reception cycle of the second UE. In some cases, the first set of one or more paging occasions associated with first UE correspond to a subset of the second set of one or more paging occasions associated with the second UE.

The memory manager 725 may store the received first paging information in memory.

Figure 8:
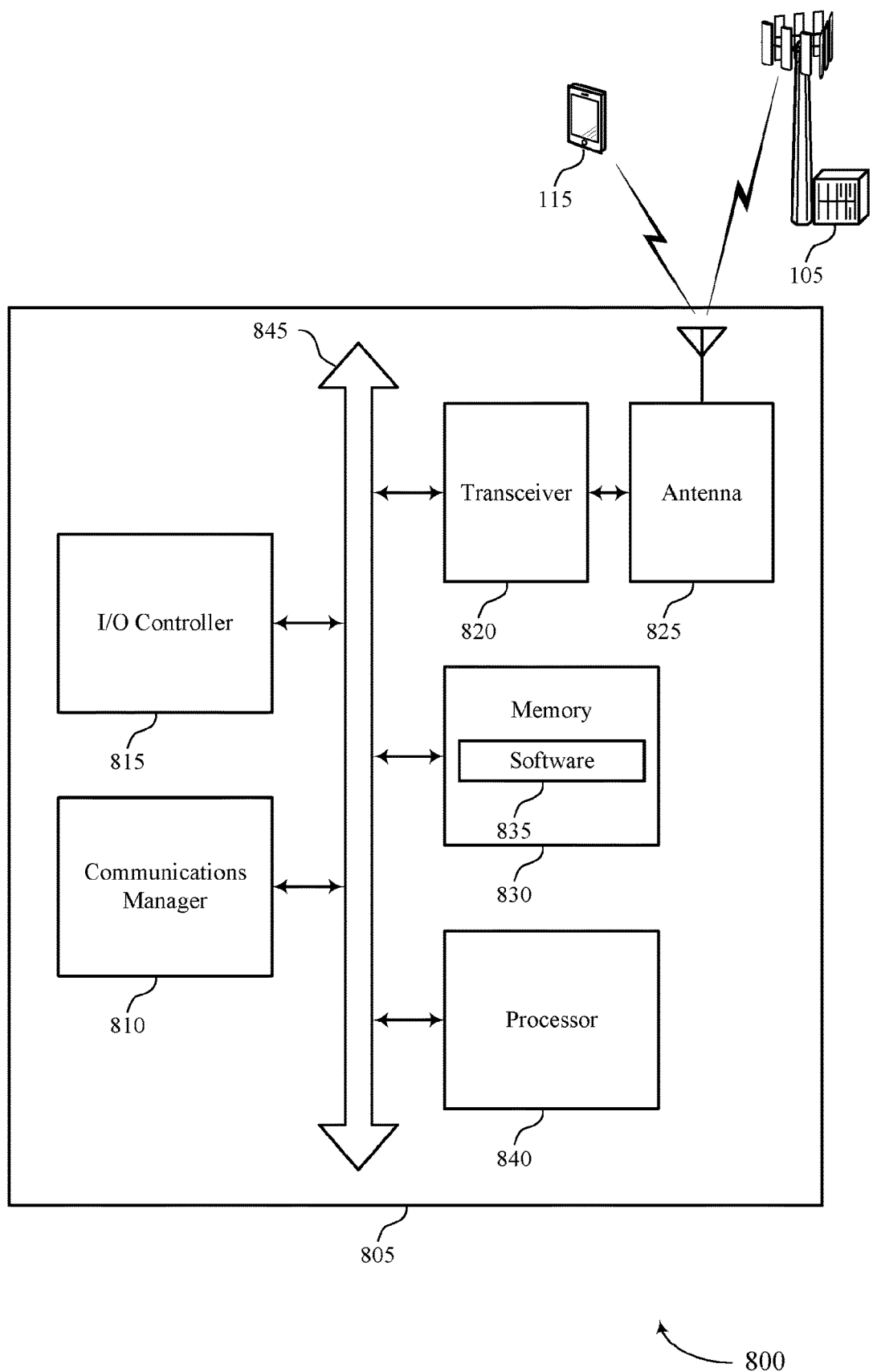
FIG. 8 shows a diagram of a system including a device that supports DRX cycle extension and paging with external assistance in accordance with aspects of the present disclosure.

FIG. 8 shows a diagram of a system 800 including a device 805 that supports DRX cycle extension and paging with external assistance in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive a request for paging assistance from a first UE, receive first paging information from a base station based on the received request, and transmit the received first paging information to the first UE based on the request.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code or software 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting DRX cycle extension and paging with external assistance).

The software 835 may include instructions to implement aspects of the present disclosure, including instructions to support wireless communications. The software 835 may be stored in a non-transitory computer-readable medium such as system memory or other type of memory. In some cases, the software 835 may not be directly executable by the processor 840 but may cause a computer (e.g., when compiled and executed) to perform functions described herein.

Figure 9:
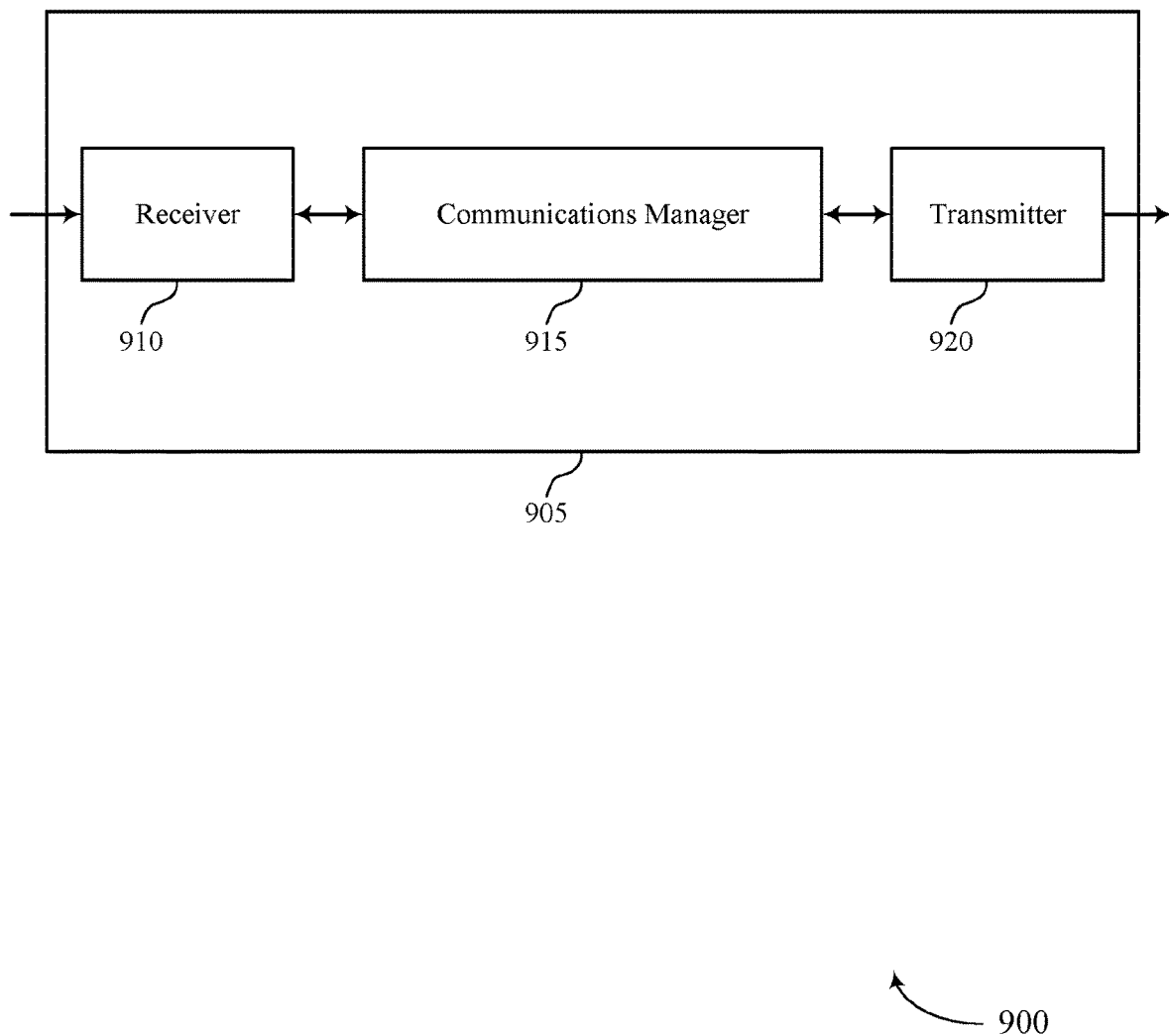
FIGS. 9 and 10 show block diagrams of devices that support DRX cycle extension and paging with external assistance in accordance with aspects of the present disclosure.

FIG. 9 shows a block diagram 900 of a device 905 that supports DRX cycle extension and paging with external assistance in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to DRX cycle extension and paging with external assistance, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may determine a second UE is assisting paging operations for a first UE, configure a first set of one or more paging occasions for first paging information associated with the first UE based on the determination, and transmit, to the second UE, the first paging information associated with the first UE based on the configured one or more paging occasions. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
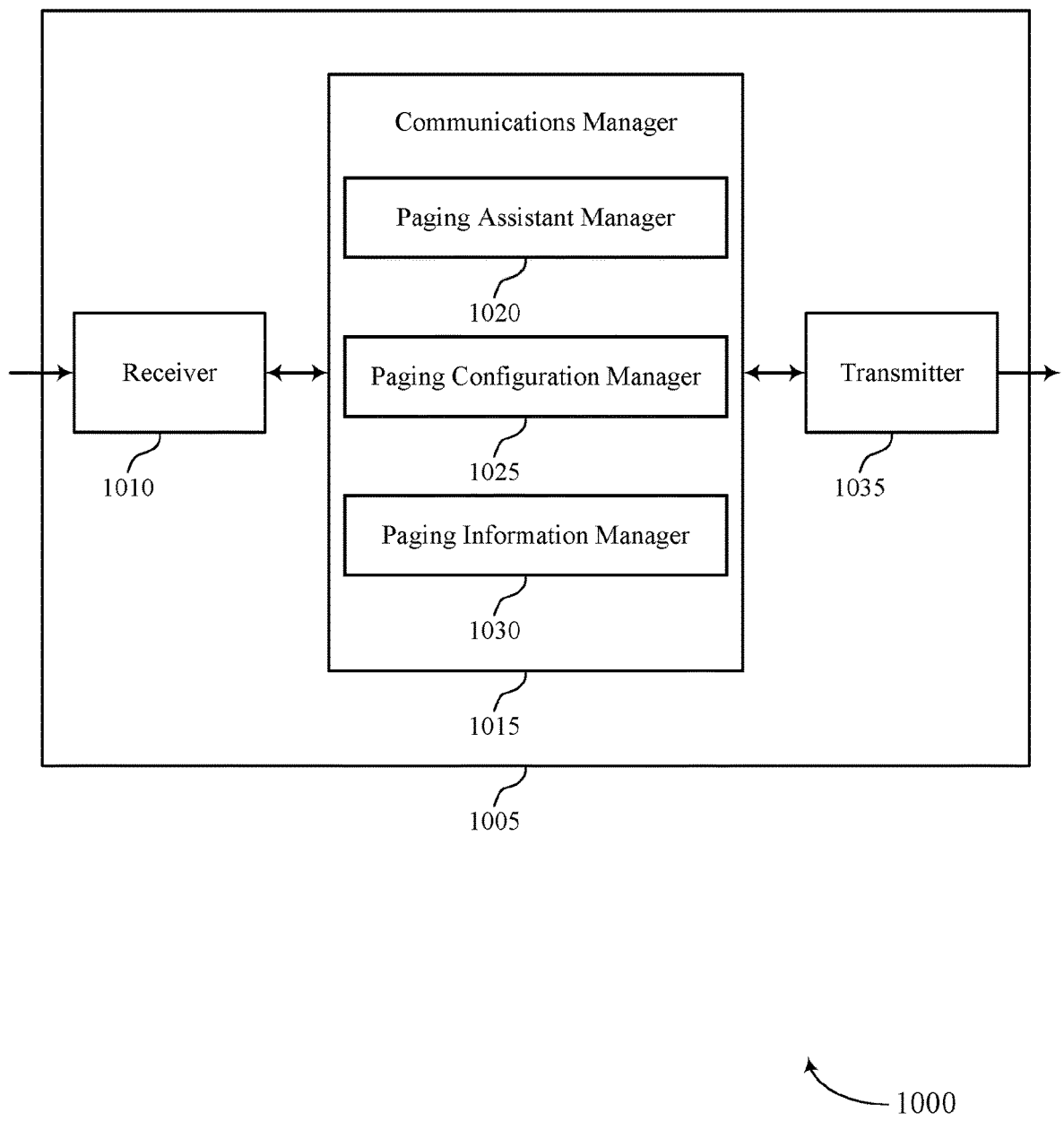

FIG. 10 shows a block diagram 1000 of a device 1005 that supports DRX cycle extension and paging with external assistance in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to DRX cycle extension and paging with external assistance, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a paging assistant manager 1020, a paging configuration manager 1025, and a paging information manager 1030. The communications manager 1015 may be an example of aspects of the communications manager 1210 described herein.

The paging assistant manager 1020 may determine a second UE is assisting paging operations for a first UE. The paging configuration manager 1025 may configure a first set of one or more paging occasions for first paging information associated with the first UE based on the determination. The paging information manager 1030 may transmit, to the second UE, the first paging information associated with the first UE based on the configured one or more paging occasions.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
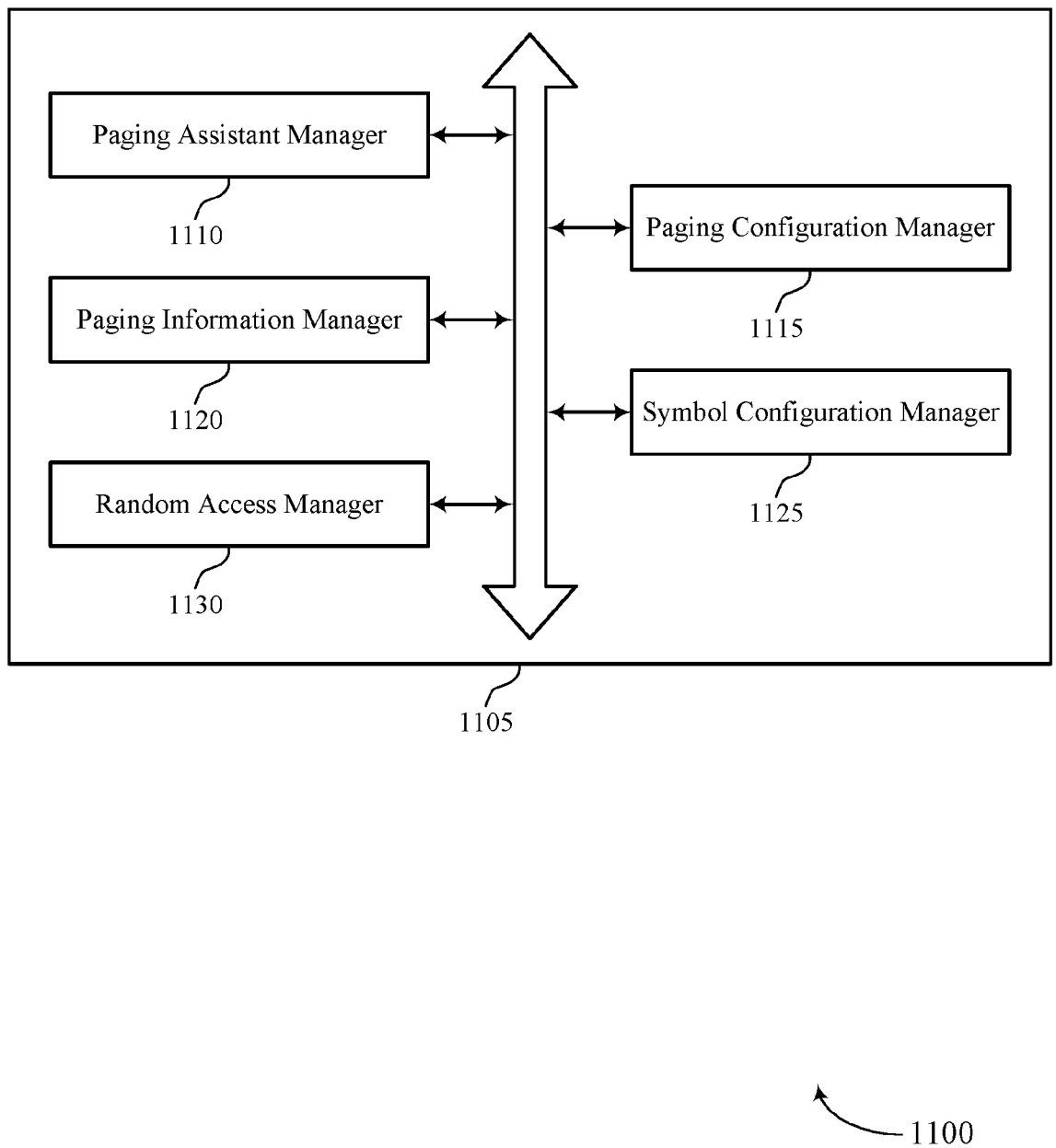
FIG. 11 shows a block diagram of a communications manager that supports DRX cycle extension and paging with external assistance in accordance with aspects of the present disclosure.

FIG. 11 shows a block diagram 1100 of a communications manager 1105 that supports DRX cycle extension and paging with external assistance in accordance with aspects of the present disclosure. The communications manager 1105 may be an example of aspects of a communications manager 915, a communications manager 1015, or a communications manager 1210 described herein. The communications manager 1105 may include a paging assistant manager 1110, a paging configuration manager 1115, a paging information manager 1120, a symbol configuration manager 1125, and a random access manager 1130. Each of these modules may communicate, directly or indirectly, with one another (e.g., via one or more buses).

The paging assistant manager 1110 may determine a second UE is assisting paging operations for a first UE.

The paging configuration manager 1115 may configure a first set of one or more paging occasions for first paging information associated with the first UE based on the determination. In some examples, the paging configuration manager 1115 may identify the second UE is operating according to a first discontinuous reception cycle. In some examples, the paging configuration manager 1115 may determine a second set of one or more paging occasions associated with the second UE based on the first discontinuous reception cycle, where the first set of one or more paging occasions are configured based on the second set of one or more paging occasions. In some examples, the paging configuration manager 1115 may configure downlink symbols to the second UE based on the configured first set of one or more paging occasions for first paging information associated with the first UE.

In some examples, the paging configuration manager 1115 may identify a second set of one or more paging occasions skipped by the first UE. In some examples, identifying a third set of one or more paging occasions monitored by the first UE, where the first set of one or more paging occasions includes the second set of one or more paging occasions. In some cases, a first paging periodicity associated with a second discontinuous reception cycle associated with the first UE corresponds to a multiple of a second paging periodicity associated with the first discontinuous reception cycle associated with the second UE. In some cases, the configured first set of one or more paging occasions associated with the first UE correspond to a subset of the second set of one or more paging occasions associated with the second UE.

The paging information manager 1120 may transmit, to the second UE, the first paging information associated with the first UE based on the configured one or more paging occasions.

The symbol configuration manager 1125 may configure downlink symbols to the second UE based on the second set of one or more paging occasions for first paging information associated with the first UE. In some examples, the symbol configuration manager 1125 may configure downlink symbols to the first UE based on the third set of one or more paging occasions.

The random access manager 1130 may perform a random access channel procedure to establish a radio resource connection to the first UE based on the third set of one or more paging occasions, where the first paging information includes a connection request.

Figure 12:
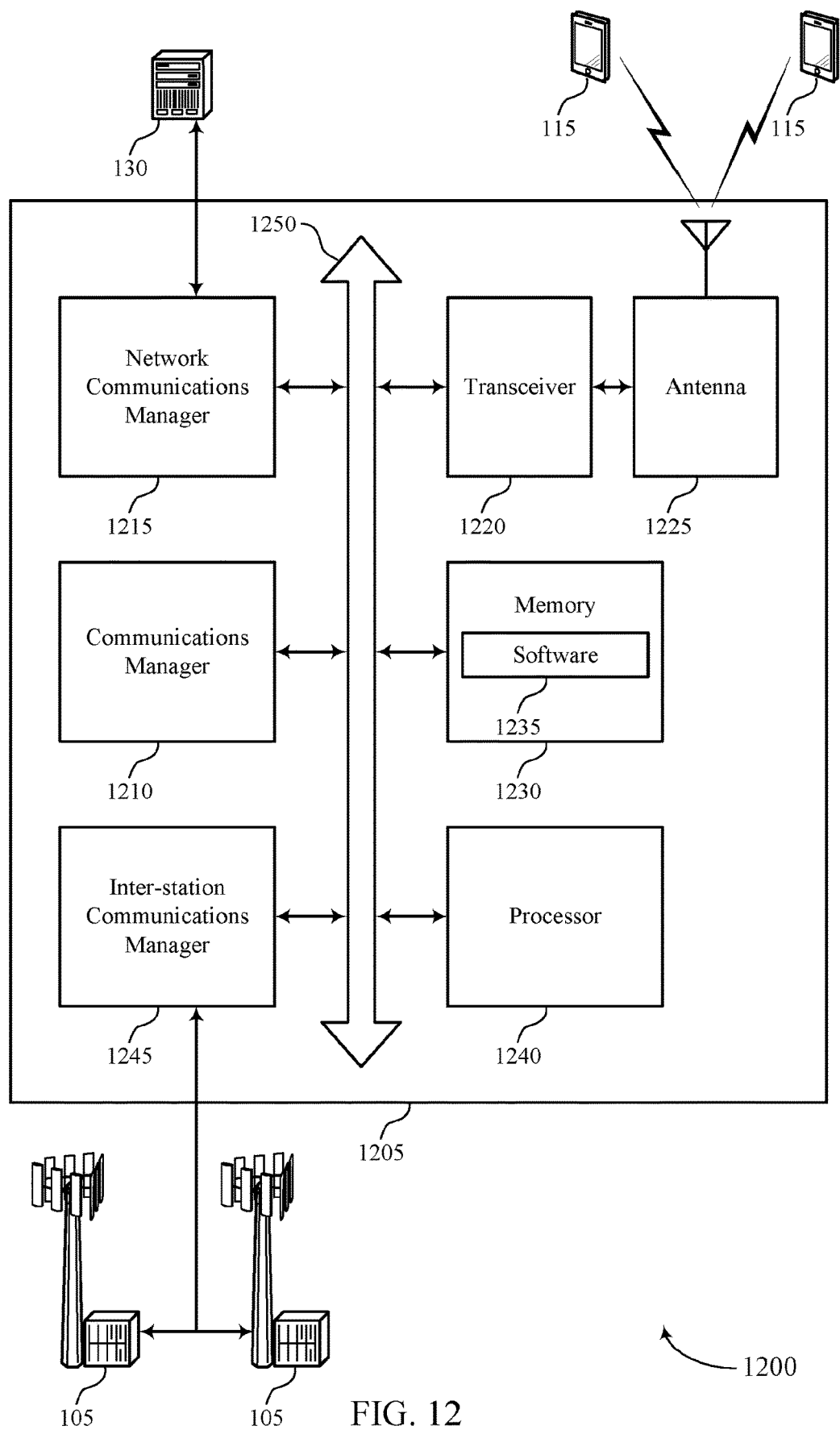
FIG. 12 shows a diagram of a system including a device that supports DRX cycle extension and paging with external assistance in accordance with aspects of the present disclosure.

FIG. 12 shows a diagram of a system 1200 including a device 1205 that supports DRX cycle extension and paging with external assistance in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may determine a second UE is assisting paging operations for a first UE, configure a first set of one or more paging occasions for first paging information associated with the first UE based on the determination, and transmit, to the second UE, the first paging information associated with the first UE based on the configured one or more paging occasions.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code or software 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting DRX cycle extension and paging with external assistance).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The software 1235 may include instructions to implement aspects of the present disclosure, including instructions to support wireless communications. The software 1235 may be stored in a non-transitory computer-readable medium such as system memory or other type of memory. In some cases, the software 1235 may not be directly executable by the processor 1240 but may cause a computer (e.g., when compiled and executed) to perform functions described herein.

Figure 13:
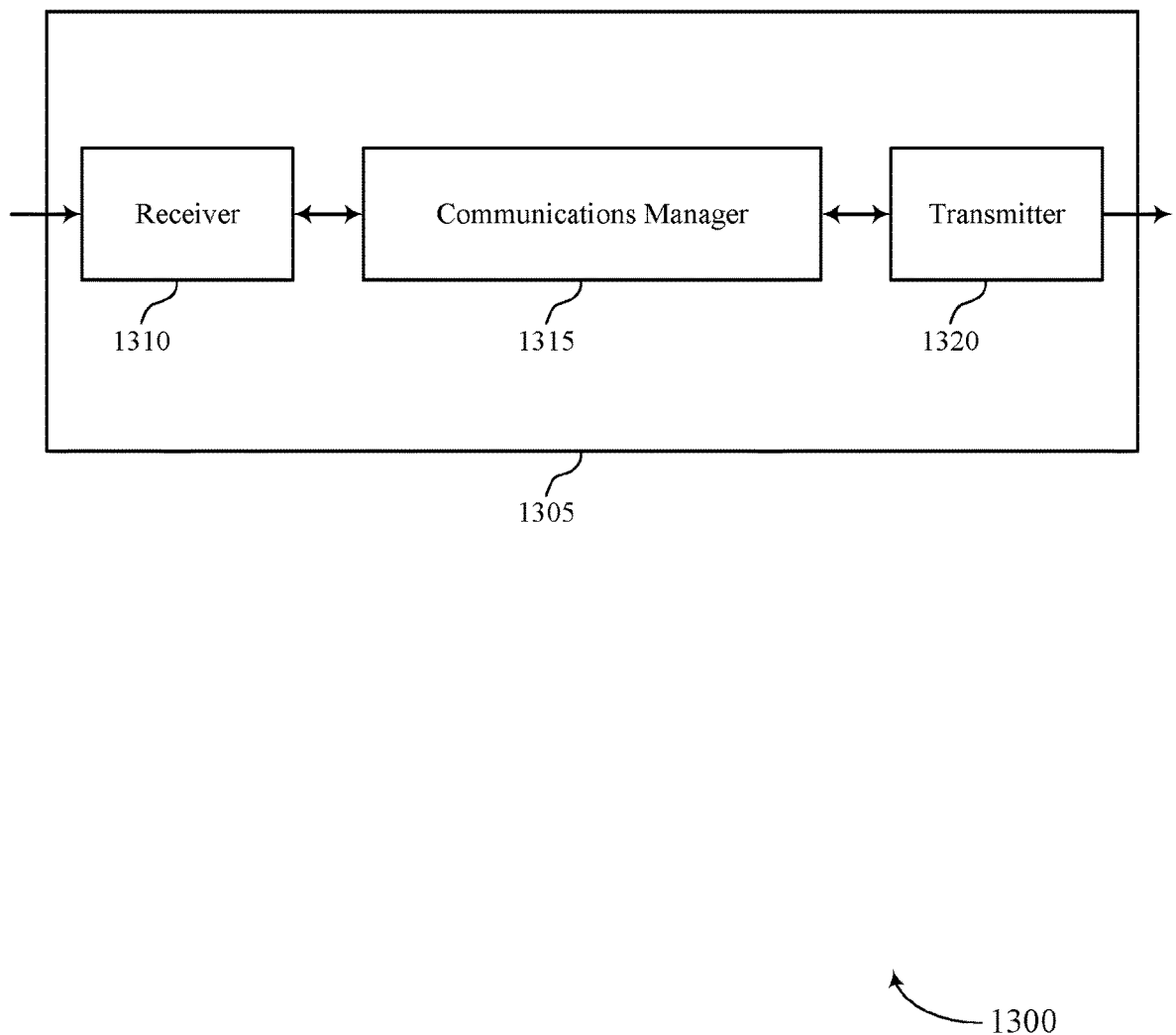
FIGS. 13 and 14 show block diagrams of devices that support DRX cycle extension and paging with external assistance in accordance with aspects of the present disclosure.

FIG. 13 shows a block diagram 1300 of a device 1305 that supports DRX cycle extension and paging with external assistance in accordance with aspects of the present disclosure. The device 1305 may be an example of aspects of a low complexity UE 140 as described herein. The device 1305 may include a receiver 1310, a communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to DRX cycle extension and paging with external assistance, etc.). Information may be passed on to other components of the device 1305. The receiver 1310 may be an example of aspects of the transceiver 1620 described with reference to FIG. 16. The receiver 1310 may utilize a single antenna or a set of antennas.

The communications manager 1315 may transmit a request for paging assistance to a second UE, configure a first discontinuous reception cycle associated with an extended paging periodicity based on the transmitted request, and receive paging information from the second UE in response to the configured first discontinuous reception cycle, where the paging information includes paging information from a base station. The communications manager 1315 may be an example of aspects of the communications manager 1610 described herein.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
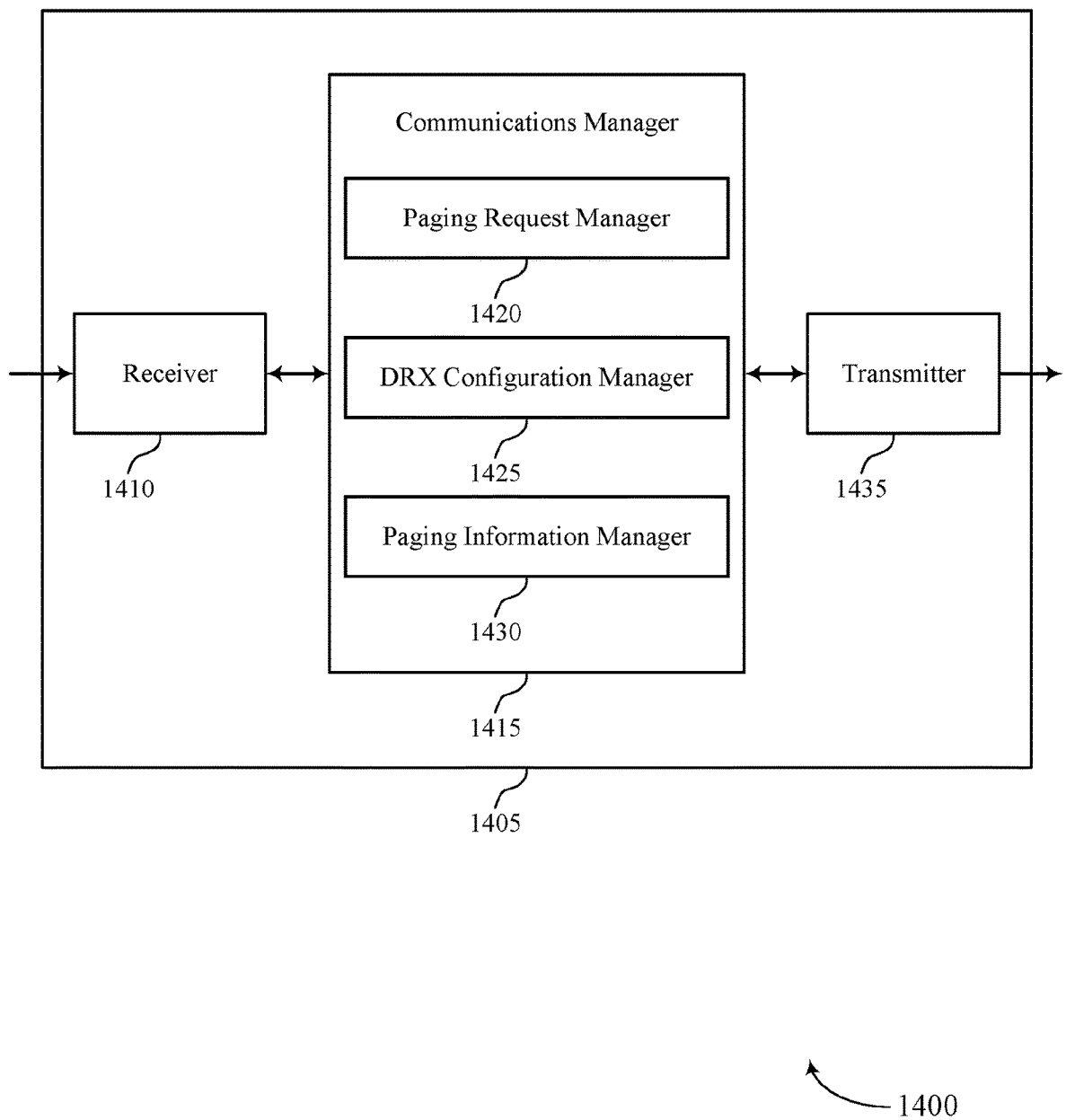

FIG. 14 shows a block diagram 1400 of a device 1405 that supports DRX cycle extension and paging with external assistance in accordance with aspects of the present disclosure. The device 1405 may be an example of aspects of a device 1305 or a low complexity UE 140 as described herein. The device 1405 may include a receiver 1410, a communications manager 1415, and a transmitter 1435. The device 1405 may also include a processor. Each of these components may be in communication with one another (e.g., via one or more buses).

The receiver 1410 may receive information such as packets, user data, or control information associated with various information channels (e.g., control channels, data channels, and information related to DRX cycle extension and paging with external assistance, etc.). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include a paging request manager 1420, a DRX configuration manager 1425, and a paging information manager 1430. The communications manager 1415 may be an example of aspects of the communications manager 1610 described herein.

The paging request manager 1420 may transmit a request for paging assistance to a second UE. The DRX configuration manager 1425 may configure a first discontinuous reception cycle associated with an extended paging periodicity based on the transmitted request. The paging information manager 1430 may receive paging information from the second UE in response to the configured first discontinuous reception cycle, where the paging information includes paging information from a base station.

The transmitter 1435 may transmit signals generated by other components of the device 1405. In some examples, the transmitter 1435 may be collocated with a receiver 1410 in a transceiver module. For example, the transmitter 1435 may be an example of aspects of the transceiver 1620 described with reference to FIG. 16. The transmitter 1435 may utilize a single antenna or a set of antennas.

Figure 15:
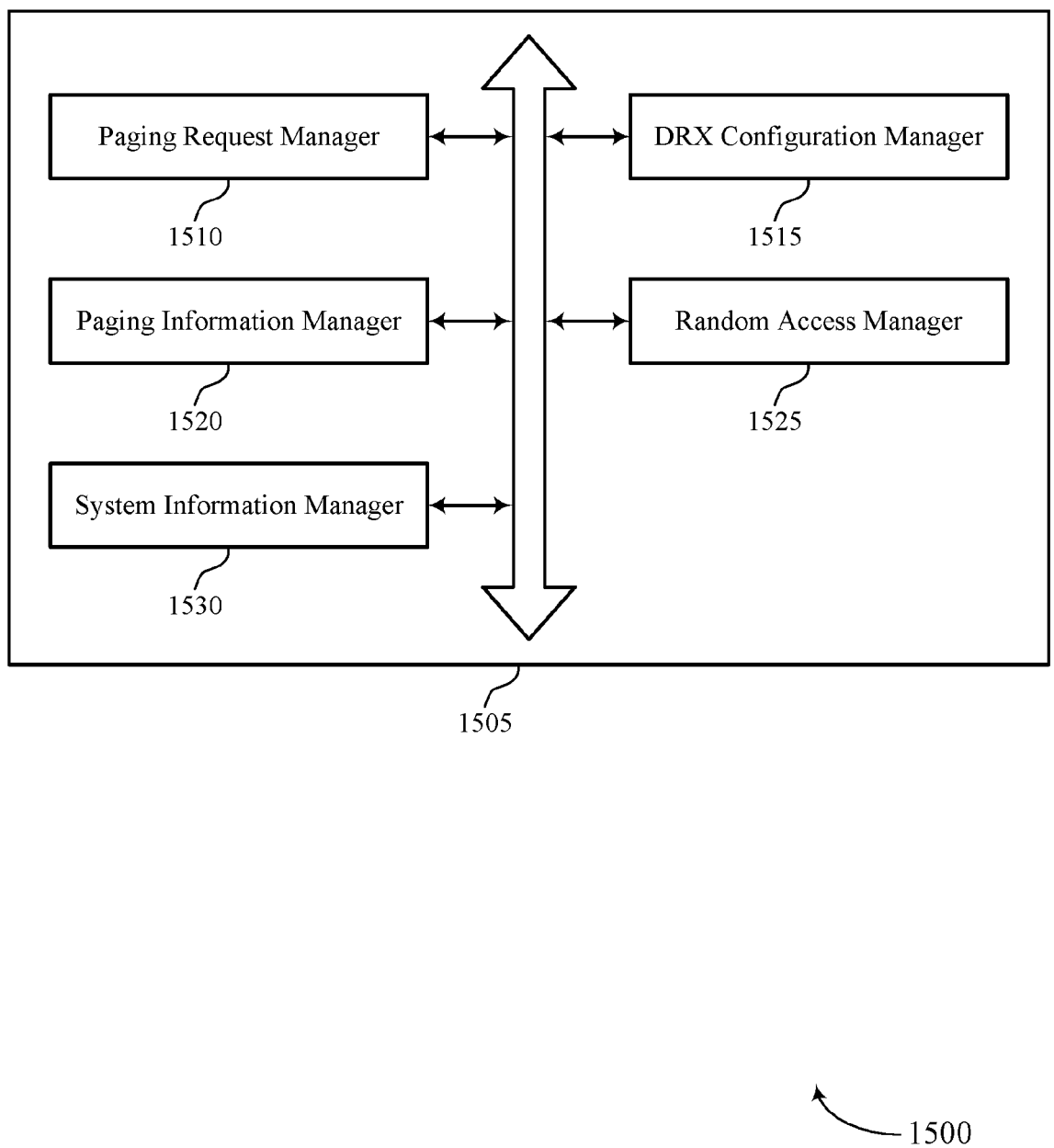
FIG. 15 shows a block diagram of a communications manager that supports DRX cycle extension and paging with external assistance in accordance with aspects of the present disclosure.

FIG. 15 shows a block diagram 1500 of a communications manager 1505 that supports DRX cycle extension and paging with external assistance in accordance with aspects of the present disclosure. The communications manager 1505 may be an example of aspects of a communications manager 1315, a communications manager 1415, or a communications manager 1610 described herein. The communications manager 1505 may include a paging request manager 1510, a DRX configuration manager 1515, a paging information manager 1520, a random access manager 1525, and a system information manager 1530. Each of these modules may communicate, directly or indirectly, with one another (e.g., via one or more buses).

The paging request manager 1510 may transmit a request for paging assistance to a second UE. In some examples, the paging request manager 1510 may transmit discontinuous reception cycle information configured by the base station. In some cases, the request for paging assistance is transmitted to the second UE using a device-to-device link between the first UE and the second UE, and the paging information is received from the second UE using the device-to-device link.

The DRX configuration manager 1515 may configure a first discontinuous reception cycle associated with an extended paging periodicity based on the transmitted request. In some examples, identifying information corresponding to a second discontinuous reception cycle configured for the first UE, where the request for paging assistance includes the information corresponding to the second discontinuous reception cycle and an identification of the first UE. In some examples, the DRX configuration manager 1515 may skip one or more paging occasions associated with the second discontinuous reception cycle. In some cases, the information corresponding to the second discontinuous reception cycle includes a paging periodicity that is shorter than the extended paging periodicity, one or more paging occasions, an identifier of the second discontinuous reception cycle, or some combination thereof.

In some cases, the received paging information from the second UE includes paging information from a base station during the skipped one or more paging occasions. In some cases, one or more paging occasions associated with the second discontinuous reception cycle correspond to a subset of one or more paging occasions associated with a third discontinuous reception cycle configured for the second UE. In some cases, a first paging periodicity associated with the second discontinuous reception cycle corresponds to a multiple of a second paging periodicity associated with a third discontinuous reception cycle configured for the second UE. In some cases, the first discontinuous reception cycle is associated with an active state and an idle state of the first UE. In some cases, the first discontinuous reception cycle is associated with an active state and an inactive state of the first UE.

The paging information manager 1520 may receive paging information from the second UE in response to the configured first discontinuous reception cycle, where the paging information includes paging information from a base station. In some examples, the paging information manager 1520 may transition to an active state during a paging occasion of the first discontinuous reception cycle based on the configured first discontinuous reception cycle, where the paging information is received based on the transitioning. In some examples, the paging information manager 1520 may receive second paging information from the base station in response to the configured first discontinuous reception cycle.

The random access manager 1525 may perform a random access channel procedure to establish a radio resource connection to the base station based on the received paging information, where the received paging information includes a connection request from the base station.

The system information manager 1530 may receive updated system information based on the received paging information, where the received paging information indicates a system information update.

Figure 16:
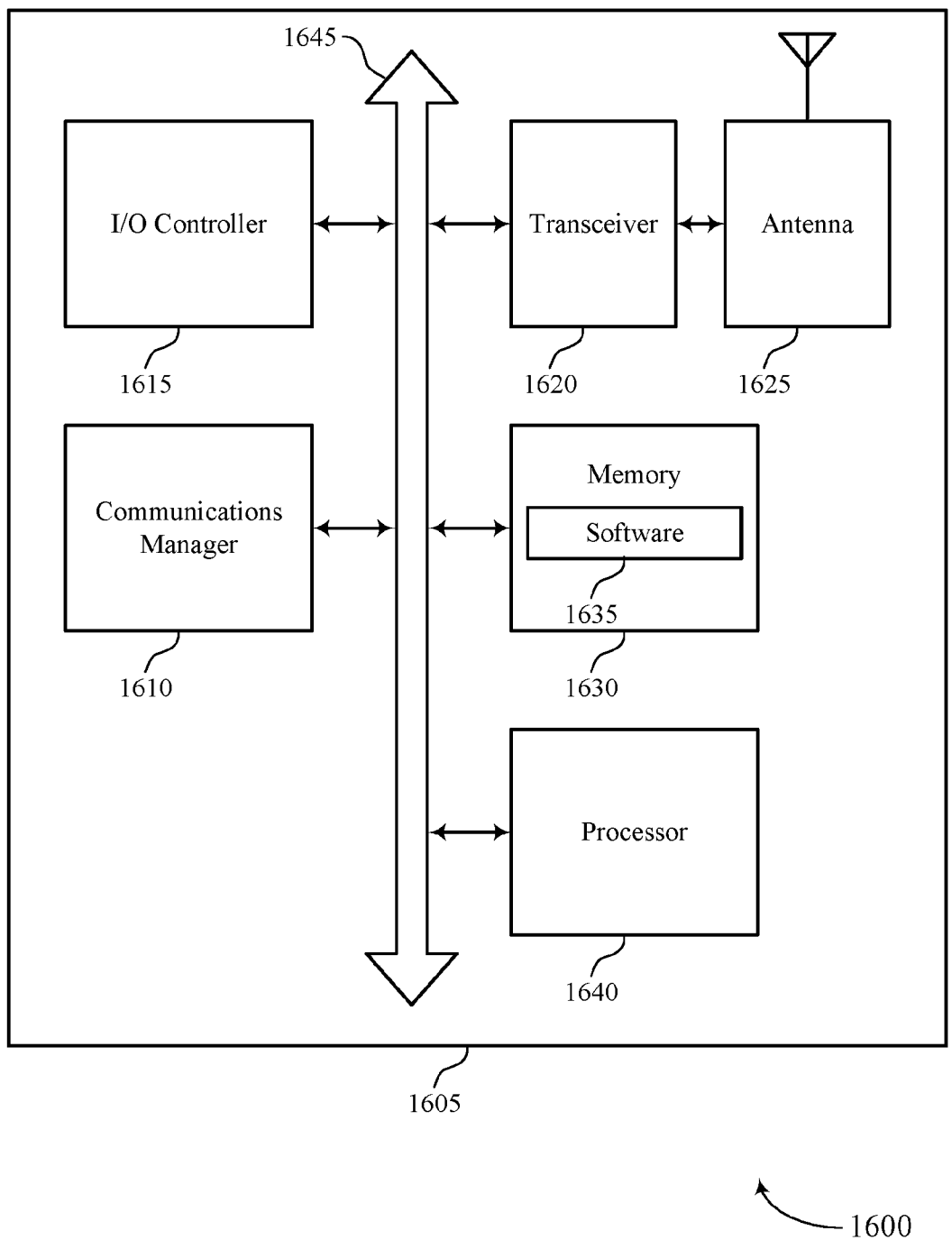
FIG. 16 shows a diagram of a system including a device that supports DRX cycle extension and paging with external assistance in accordance with aspects of the present disclosure.

FIG. 16 shows a diagram of a system 1600 including a device 1605 that supports DRX cycle extension and paging with external assistance in accordance with aspects of the present disclosure. The device 1605 may be an example of or include the components of device 1305, device 1405, or a low complexity UE 140 as described herein. The device 1605 may include components for bi-directional voice and data communications including components for transmitting and receiving communications, including a communications manager 1610, an I/O controller 1615, a transceiver 1620, an antenna 1625, memory 1630, a processor 1640, and a coding manager 1650. These components may be in electronic communication via one or more buses (e.g., bus 1645).

The communications manager 1610 may transmit a request for paging assistance to a second UE, configure a first discontinuous reception cycle associated with an extended paging periodicity based on the transmitted request, and receive paging information from the second UE in response to the configured first discontinuous reception cycle, where the paging information includes paging information from a base station.

The I/O controller 1615 may manage input and output signals for the device 1605. The I/O controller 1615 may also manage peripherals not integrated into the device 1605. In some cases, the I/O controller 1615 may represent a physical connection or port to an external peripheral. In some cases, the I/O controller 1615 may utilize an operating system such as iOS®, ANDROID®, MS-DOS®, MS-WINDOWS®, OS/2®, UNIX®, LINUX®, or another known operating system. In other cases, the I/O controller 1615 may represent or interact with a modem, a keyboard, a mouse, a touchscreen, or a similar device. In some cases, the I/O controller 1615 may be implemented as part of a processor. In some cases, a user may interact with the device 1605 via the I/O controller 1615 or via hardware components controlled by the I/O controller 1615.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM and ROM. The memory 1630 may store computer-readable, computer-executable code or software 1635 including instructions that, when executed, cause the processor to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting DRX cycle extension and paging with external assistance).

The software 1635 may include instructions to implement aspects of the present disclosure, including instructions to support wireless communications. The software 1635 may be stored in a non-transitory computer-readable medium such as system memory or other type of memory. In some cases, the software 1635 may not be directly executable by the processor 1640 but may cause a computer (e.g., when compiled and executed) to perform functions described herein.

Figure 17:
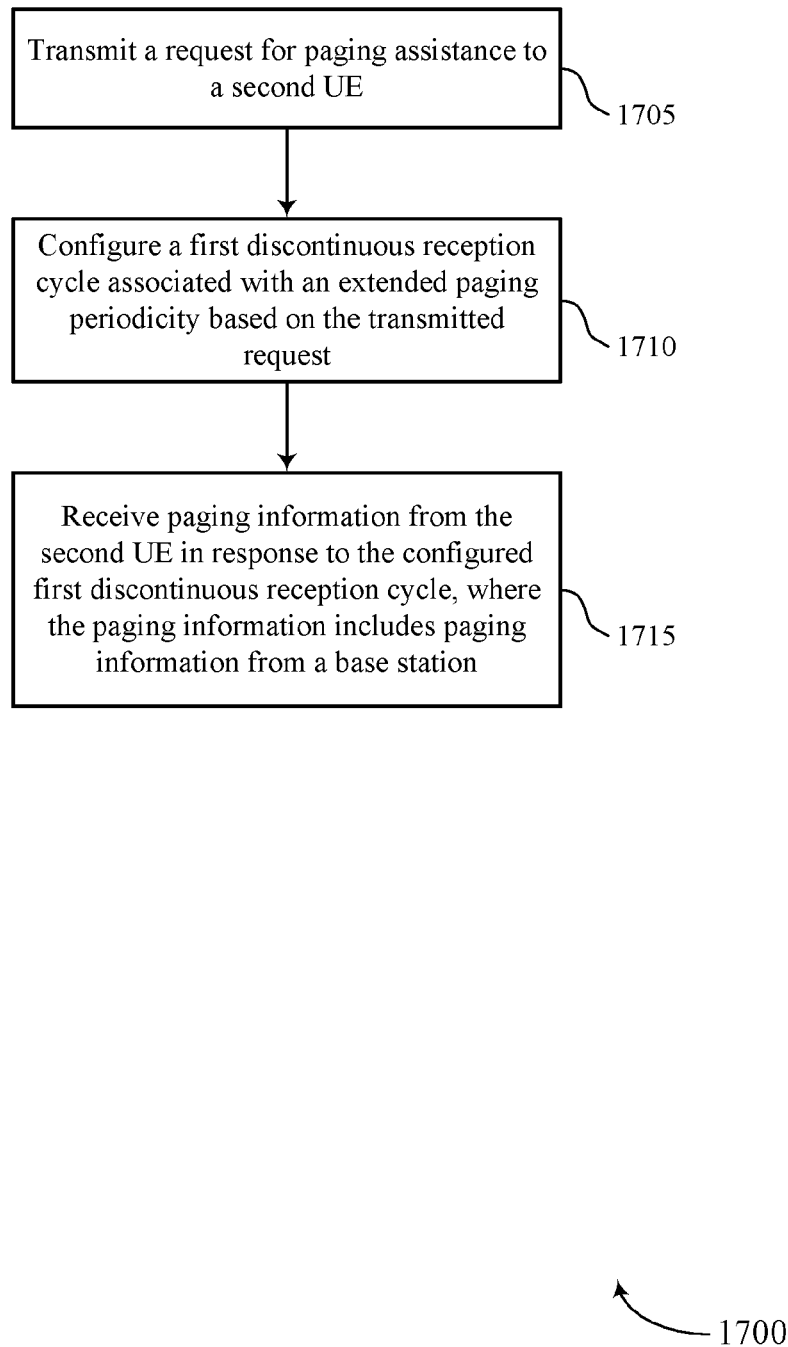
FIGS. 17 through 20 show flowcharts illustrating methods that support DRX cycle extension and paging with external assistance in accordance with aspects of the present disclosure.

FIG. 17 shows a flowchart illustrating a method 1700 that supports DRX cycle extension and paging with external assistance in accordance with aspects of the present disclosure. The operations of method 1700 may be implemented by a device (e.g., a low complexity UE 140) or its components as described herein. For example, the operations of method 1700 may be performed by a communications manager as described with reference to FIGS. 13 through 16. In some examples, a device may execute a set of instructions to control the functional elements of the device to perform the functions described below. Additionally or alternatively, a device may perform aspects of the functions described below using special-purpose hardware.

At 1705, the device may transmit a request for paging assistance to a second UE. The operations of 1705 may be performed according to the methods described herein. In some examples, aspects of the operations of 1705 may be performed by a paging request manager as described with reference to FIGS. 13 through 16.

At 1710, the device may configure a first discontinuous reception cycle associated with an extended paging periodicity based on the transmitted request. The operations of 1710 may be performed according to the methods described herein. In some examples, aspects of the operations of 1710 may be performed by a DRX configuration manager as described with reference to FIGS. 13 through 16.

At 1715, the device may receive paging information from the second UE in response to the configured first discontinuous reception cycle, where the paging information includes paging information from a base station. The operations of 1715 may be performed according to the methods described herein. In some examples, aspects of the operations of 1715 may be performed by a paging information manager as described with reference to FIGS. 13 through 16.

Figure 18:
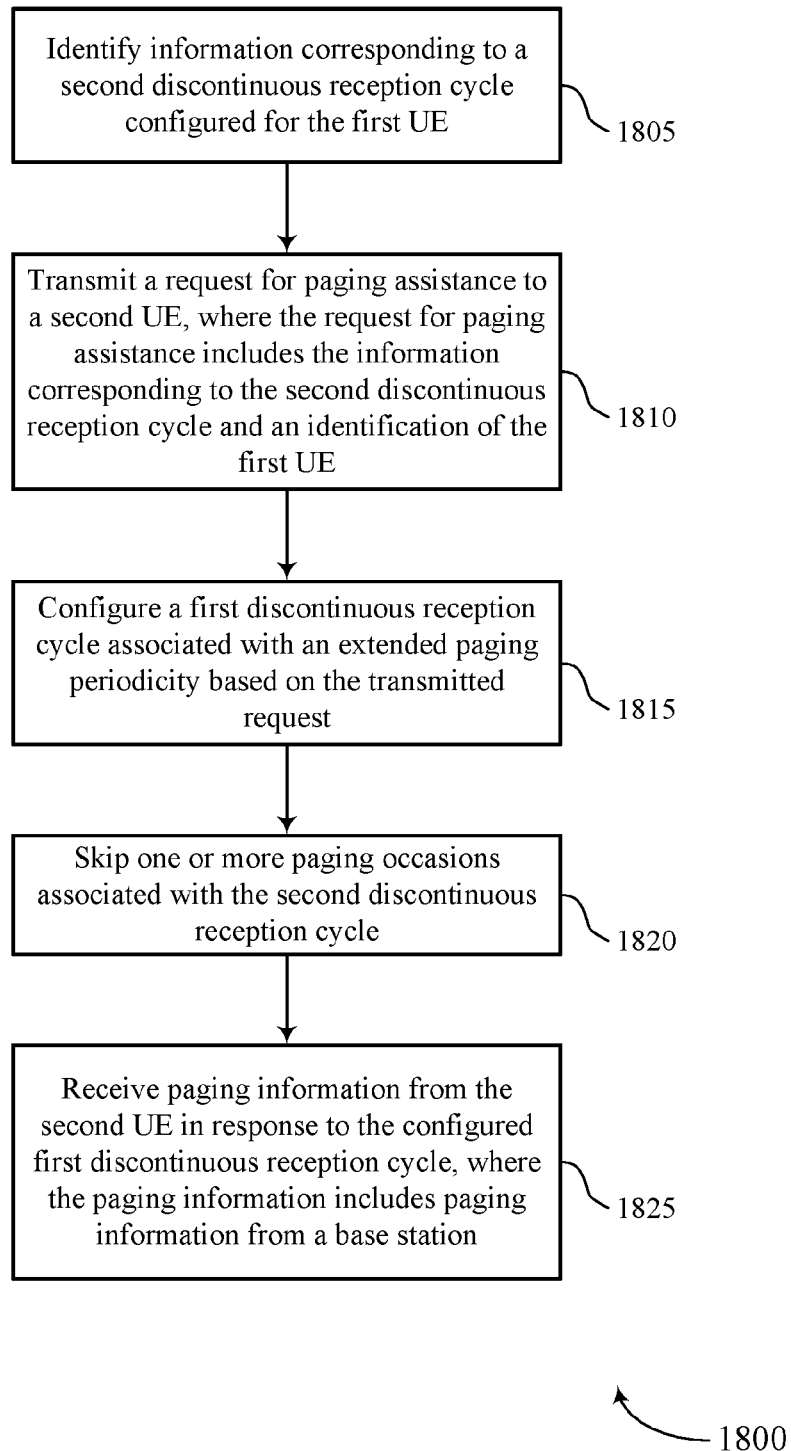

FIG. 18 shows a flowchart illustrating a method 1800 that supports DRX cycle extension and paging with external assistance in accordance with aspects of the present disclosure. The operations of method 1800 may be implemented by a device (e.g., a first UE such as a low complexity UE 140) or its components as described herein. For example, the operations of method 1800 may be performed by a communications manager as described with reference to FIGS. 13 through 16. In some examples, a device may execute a set of instructions to control the functional elements of the device to perform the functions described below. Additionally or alternatively, a device may perform aspects of the functions described below using special-purpose hardware.

At 1805, the device may identify information corresponding to a second discontinuous reception cycle configured for the device. The operations of 1805 may be performed according to the methods described herein. In some examples, aspects of the operations of 1805 may be performed by a DRX configuration manager as described with reference to FIGS. 13 through 16.

At 1810, the device may transmit a request for paging assistance to a second UE, where the request for paging assistance includes the information corresponding to the second discontinuous reception cycle and an identification of the device. The operations of 1810 may be performed according to the methods described herein. In some examples, aspects of the operations of 1810 may be performed by a paging request manager as described with reference to FIGS. 13 through 16.

At 1815, the device may configure a first discontinuous reception cycle associated with an extended paging periodicity based on the transmitted request. The operations of 1815 may be performed according to the methods described herein. In some examples, aspects of the operations of 1815 may be performed by a DRX configuration manager as described with reference to FIGS. 13 through 16.

At 1820, the device may skip one or more paging occasions associated with the second discontinuous reception cycle (e.g., in accordance with the configured first discontinuous reception cycle). The operations of 1820 may be performed according to the methods described herein. In some examples, aspects of the operations of 1820 may be performed by a DRX configuration manager as described with reference to FIGS. 13 through 16.

At 1825, the device may receive paging information from the second UE in response to the configured first discontinuous reception cycle (e.g., in accordance with paging occasions of the configured first discontinuous reception cycle), where the paging information includes paging information from a base station (e.g., forwarded by or relayed from the second UE). The operations of 1825 may be performed according to the methods described herein. In some examples, aspects of the operations of 1825 may be performed by a paging information manager as described with reference to FIGS. 13 through 16.

Figure 19:
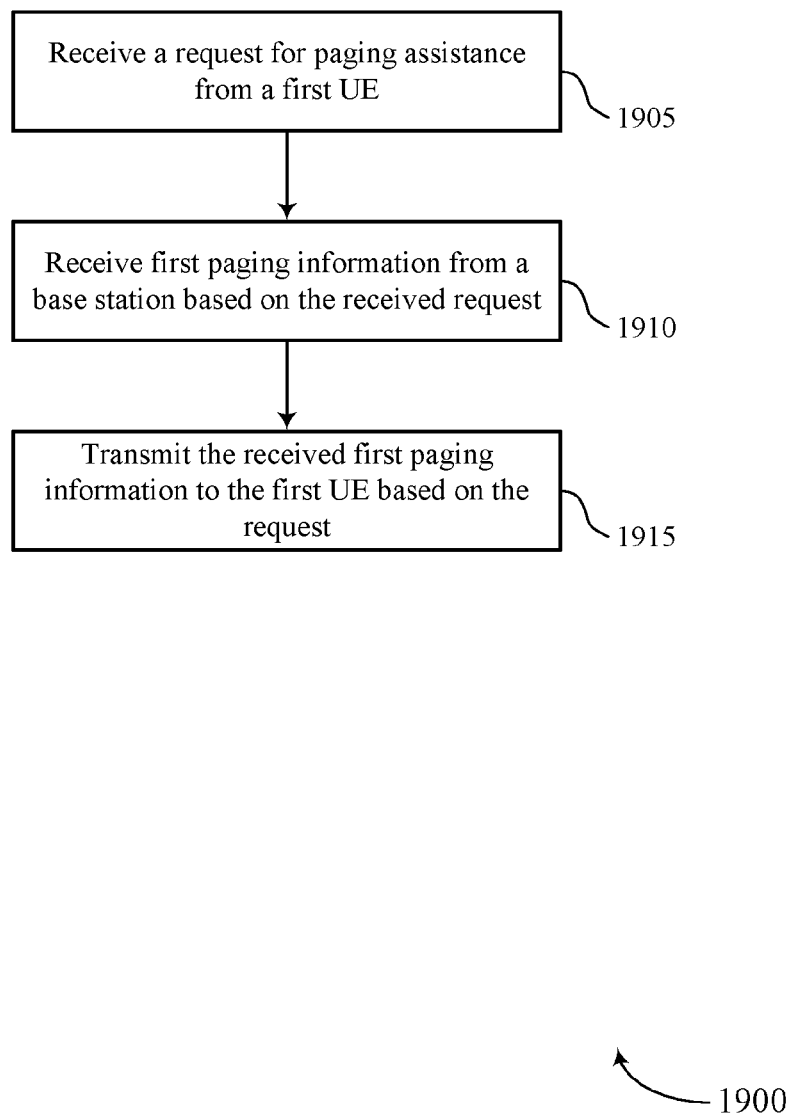

FIG. 19 shows a flowchart illustrating a method 1900 that supports DRX cycle extension and paging with external assistance in accordance with aspects of the present disclosure. The operations of method 1900 may be implemented by a UE 115 or its components as described herein. For example, the operations of method 1900 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1905, the UE may receive a request for paging assistance from a first UE (e.g., from a low complexity UE 140). The operations of 1905 may be performed according to the methods described herein. In some examples, aspects of the operations of 1905 may be performed by a paging request manager as described with reference to FIGS. 5 through 8.

At 1910, the UE may receive first paging information from a base station based on the received request. The operations of 1910 may be performed according to the methods described herein. In some examples, aspects of the operations of 1910 may be performed by a paging information manager as described with reference to FIGS. 5 through 8.

At 1915, the UE may transmit the received first paging information to the first UE (e.g., to the low complexity UE 140) based on the request. The operations of 1915 may be performed according to the methods described herein. In some examples, aspects of the operations of 1915 may be performed by a paging information manager as described with reference to FIGS. 5 through 8.

Figure 20:
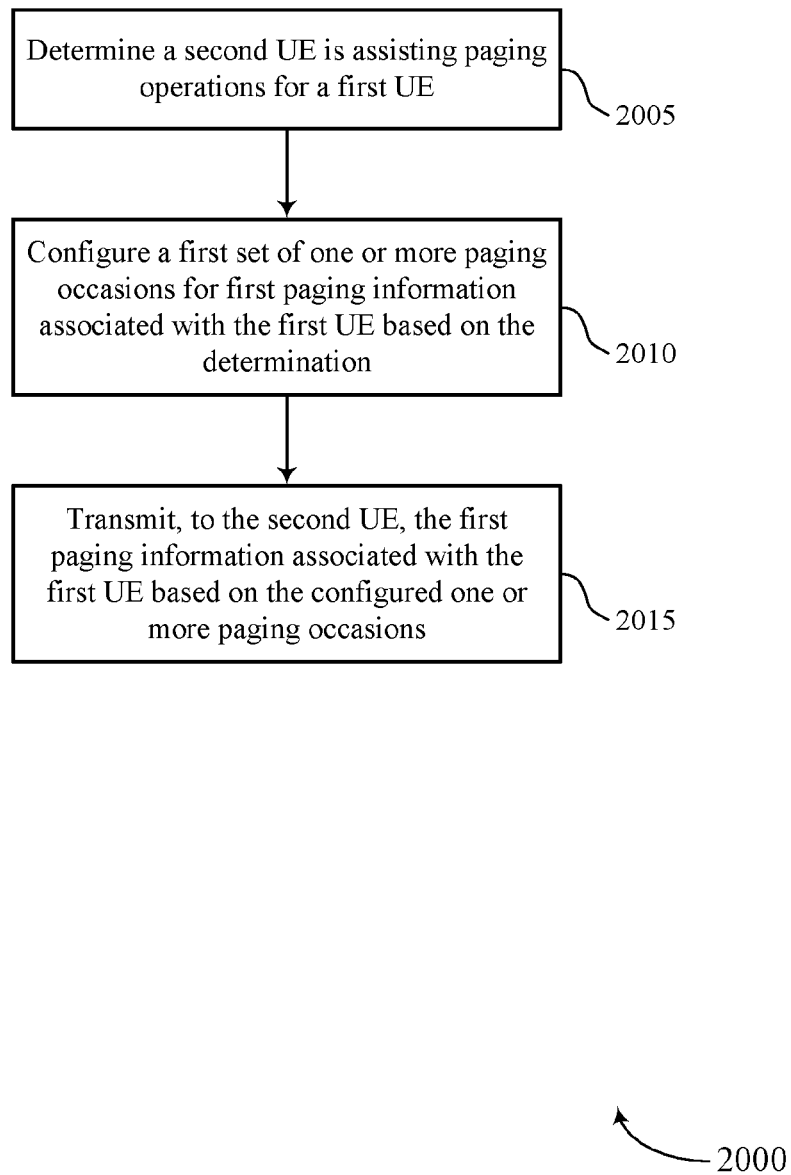

FIG. 20 shows a flowchart illustrating a method 2000 that supports DRX cycle extension and paging with external assistance in accordance with aspects of the present disclosure. The operations of method 2000 may be implemented by a base station 105 or its components as described herein. For example, the operations of method 2000 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 2005, the base station may determine a second UE (e.g., a UE 115) is assisting paging operations for a first UE (e.g., for a low complexity UE 140). The operations of 2005 may be performed according to the methods described herein. In some examples, aspects of the operations of 2005 may be performed by a paging assistant manager as described with reference to FIGS. 9 through 12.

At 2010, the base station may configure a first set of one or more paging occasions for first paging information associated with the first UE (e.g., the low complexity UE 140) based on the determination. The operations of 2010 may be performed according to the methods described herein. In some examples, aspects of the operations of 2010 may be performed by a paging configuration manager as described with reference to FIGS. 9 through 12.

At 2015, the base station may transmit, to the second UE (e.g., the UE 115), the first paging information associated with the first UE (e.g., the low complexity UE 140) based on the configured one or more paging occasions. The operations of 2015 may be performed according to the methods described herein. In some examples, aspects of the operations of 2015 may be performed by a paging information manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a first user equipment (UE), comprising:
   a processor;
   memory coupled with the processor; and
   instructions stored in the memory and executable by the processor to cause the apparatus to:
   transmit a request for paging assistance to a second UE;
   configure, based at least in part on the transmitted request, a first discontinuous reception cycle that indicates a pattern of sleep states and wakeup states and that is associated with an extended paging periodicity, wherein the extended paging periodicity corresponds to a period for receiving paging messages and is longer than a second paging periodicity configured for the first UE; and
   receive paging information from the second UE in response to the configured first discontinuous reception cycle, wherein the paging information comprises paging information from a network entity.

2. The apparatus of claim 1, wherein the instructions are further executable by the processor to cause the apparatus to:
   identify information corresponding to a second discontinuous reception cycle configured for the first UE, wherein the request for paging assistance comprises the information corresponding to the second discontinuous reception cycle and an identification of the first UE.

3. The apparatus of claim 2, wherein the information corresponding to the second discontinuous reception cycle comprises the second paging periodicity that is shorter than the extended paging periodicity, one or more paging occasions, an identifier of the second discontinuous reception cycle, or some combination thereof.

4. The apparatus of claim 2, wherein the instructions to configure the first discontinuous reception cycle are executable by the processor to cause the apparatus to:
   skip one or more paging occasions associated with the second discontinuous reception cycle.

5. The apparatus of claim 4, wherein the received paging information from the second UE comprises paging information from the network entity during the skipped one or more paging occasions.

6. The apparatus of claim 5, wherein the instructions are further executable by the processor to cause the apparatus to:
   perform a random access channel procedure to establish a radio resource connection to the network entity based at least in part on the received paging information, wherein the received paging information comprises a connection request from the network entity.

7. The apparatus of claim 5, wherein the instructions are further executable by the processor to cause the apparatus to:
   receive updated system information based at least in part on the received paging information, wherein the received paging information indicates a system information update.

8. The apparatus of claim 2, wherein one or more paging occasions associated with the second discontinuous reception cycle correspond to a subset of one or more paging occasions associated with a third discontinuous reception cycle configured for the second UE.

9. The apparatus of claim 2, wherein a first paging periodicity associated with the second discontinuous reception cycle corresponds to a multiple of a second paging periodicity associated with a third discontinuous reception cycle configured for the second UE.

10. The apparatus of claim 1, wherein the instructions are further executable by the processor to cause the apparatus to:
    transition to an active state during a paging occasion of the first discontinuous reception cycle based at least in part on the configured first discontinuous reception cycle, wherein the paging information is received based at least in part on the transitioning.

11. The apparatus of claim 1, wherein the instructions to transmit the request for paging assistance are executable by the processor to cause the apparatus to:
    transmit discontinuous reception cycle information configured by the network entity.

12. The apparatus of claim 1, wherein the instructions are further executable by the processor to cause the apparatus to:
    receive second paging information from the network entity in response to the configured first discontinuous reception cycle.

13. The apparatus of claim 1, wherein the first discontinuous reception cycle is associated with an active state and an idle state of the first UE.

14. The apparatus of claim 1, wherein the first discontinuous reception cycle is associated with an active state and an inactive state of the first UE.

15. The apparatus of claim 1, wherein the request for paging assistance is transmitted to the second UE using a device-to-device link between the first UE and the second UE, and the paging information is received from the second UE using the device-to-device link.

16. An apparatus for wireless communication at a second user equipment (UE), comprising:
a processor;
memory coupled with the processor; and
instructions stored in the memory and executable by the processor to cause the apparatus to:
receive a request for paging assistance from a first UE;
receive first paging information from a network entity based at least in part on the received request; and
transmit the received first paging information to the first UE based at least in part on the request and in accordance with a first discontinuous reception cycle of the first UE that indicates a pattern of sleep states and wakeup states and that is associated with an extended paging periodicity, wherein the extended paging periodicity corresponds to a period for paging message reception and is longer than a second paging periodicity configured for the first UE.

17. The apparatus of claim 16, wherein the instructions are further executable by the processor to cause the apparatus to:
monitor a first set of one or more paging occasions based at least in part on the received request, wherein the first paging information is received based at least in part on monitoring the first set of one or more paging occasions.

18. The apparatus of claim 17, wherein the instructions are further executable by the processor to cause the apparatus to:
identify the first set of one or more paging occasions based at least in part on the request, wherein the request comprises an identification of the first UE and information corresponding to the first discontinuous reception cycle of the first UE, the information corresponding to the first discontinuous reception cycle including at least the first set of one or more paging occasions.

19. The apparatus of claim 18, wherein a first paging periodicity associated with the first discontinuous reception cycle corresponds to a multiple of a second paging periodicity associated with a second discontinuous reception cycle configured for the second UE.

20. The apparatus of claim 17, wherein the instructions are further executable by the processor to cause the apparatus to:
monitor a second set of one or more paging occasions associated with a second discontinuous reception cycle of the second UE; and
receive second paging information from the network entity based at least in part on monitoring the second set of one or more paging occasions.

21. The apparatus of claim 20, wherein the first set of one or more paging occasions associated with first UE correspond to a subset of the second set of one or more paging occasions associated with the second UE.

22. The apparatus of claim 16, wherein the instructions are further executable by the processor to cause the apparatus to:
store the received first paging information in memory; and
identify a paging occasion associated with the first UE based at least in part on the request, wherein the stored first paging information is transmitted to the first UE based at least in part on the identified paging occasion.

23. The apparatus of claim 16, wherein the instructions are further executable by the processor to cause the apparatus to:
store the received first paging information in memory; and
receive a communication from the first UE, wherein the stored first paging information is transmitted to the first UE based at least in part on the received communication.

24. The apparatus of claim 16, wherein the first paging information comprises a connection request from the network entity.

25. The apparatus of claim 16, wherein the first paging information indicates a system information update.

26. The apparatus of claim 16, wherein the instructions to receive the request for paging assistance are executable by the processor to cause the apparatus to:
receive discontinuous reception cycle information for the first UE configured by the network entity.

27. The apparatus of claim 26, wherein the instructions are further executable by the processor to cause the apparatus to:
identify a first set of one or more paging occasions skipped by the first UE; and
identify a second set of one or more paging occasions monitored by the first UE, wherein the first paging information is received from the network entity based at least in part on the first set of one or more paging occasions.

28. The apparatus of claim 16, wherein the request for paging assistance is received from the first UE using a device-to-device link between the first UE and the second UE, and the paging information is transmitted to the first UE using the device-to-device link.

29. An apparatus for wireless communications at a network entity, comprising:
a processor,
memory coupled with the processor; and
instructions stored in the memory and executable by the processor to cause the apparatus to:
determine a second user equipment (UE) is assisting paging operations for a first UE;
configure a first set of one or more paging occasions for first paging information associated with the first UE based at least in part on the determination; and
transmit, to the second UE, the first paging information associated with the first UE based at least in part on the configured one or more paging occasions and in accordance with a first discontinuous reception cycle that indicates a pattern of sleep states and wakeup states and that is associated with an extended paging periodicity, wherein the extended paging periodicity corresponds to a period for paging message reception and is longer than a second paging periodicity configured for the UE.

30. The apparatus of claim 29, wherein the instructions are further executable by the processor to cause the apparatus to:
identify the second UE is operating according to a first discontinuous reception cycle; and
determine a second set of one or more paging occasions associated with the second UE based at least in part on the first discontinuous reception cycle, wherein the first set of one or more paging occasions are configured based at least in part on the second set of one or more paging occasions.

31. The apparatus of claim 30, wherein a first paging periodicity associated with a second discontinuous reception cycle associated with the first UE corresponds to a multiple of a second paging periodicity associated with the first discontinuous reception cycle associated with the second UE.

32. The apparatus of claim 30, wherein the configured first set of one or more paging occasions associated with the first UE correspond to a subset of the second set of one or more paging occasions associated with the second UE.

33. The apparatus of claim 29, wherein the instructions are further executable by the processor to cause the apparatus to:
configure downlink symbols to the second UE based at least in part on the configured first set of one or more paging occasions for first paging information associated with the first UE.

34. A method for wireless communication at a first user equipment (UE), comprising:
transmitting a request for paging assistance to a second UE;
configuring, based at least in part on the transmitted request, a first discontinuous reception cycle that indicates a pattern of sleep states and wakeup states and that is associated with an extended paging periodicity, wherein the extended paging periodicity corresponds to a period for receiving paging messages and is longer than a second paging periodicity configured for the UE; and
receiving paging information from the second UE in response to the configured first discontinuous reception cycle, wherein the paging information comprises paging information from a network entity.

35. A method for wireless communication at a second user equipment (UE), comprising:
receiving a request for paging assistance from a first UE;
receiving first paging information from a network entity based at least in part on the received request; and
transmitting the received first paging information to the first UE based at least in part on the request and in accordance with a first discontinuous reception cycle of the first UE that indicates a pattern of sleep states and wakeup states and that is associated with an extended paging periodicity, wherein the extended paging periodicity corresponds to a period for paging message reception and is longer than a second paging periodicity configured for the first UE.

* * * * *